US008612380B2

(12) United States Patent
Kleppner et al.

(10) Patent No.: US 8,612,380 B2
(45) Date of Patent: Dec. 17, 2013

(54) WEB-BASED COLLABORATION FOR EDITING ELECTRONIC DOCUMENTS

(75) Inventors: Paul S. Kleppner, Lexington, MA (US); Michael F. Kraley, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 501 days.

(21) Appl. No.: 12/472,132

(22) Filed: May 26, 2009

(65) Prior Publication Data
US 2013/0218845 A1    Aug. 22, 2013

(51) Int. Cl.
*G06F 17/00* (2006.01)
*G06F 17/24* (2006.01)

(52) U.S. Cl.
CPC ..................................... *G06F 17/24* (2013.01)
USPC ........... 707/608; 707/620; 707/624; 707/829; 706/14

(58) Field of Classification Search
CPC .............................. G06F 17/24; G06Q 10/10
USPC ............... 707/1, 10, 608, 609, 610, 620, 624, 707/829; 706/14, 45
See application file for complete search history.

(56) References Cited

U.S. PATENT DOCUMENTS

| | | | |
|---|---|---|---|
| 5,317,686 A | 5/1994 | Salas et al. | |
| 5,491,820 A | 2/1996 | Belove et al. | |
| 5,553,239 A | 9/1996 | Heath et al. | |
| 5,787,441 A | 7/1998 | Beckhardt | |
| 6,138,124 A | 10/2000 | Beckhardt | |
| 6,230,185 B1 | 5/2001 | Salas et al. | |
| 6,233,600 B1 | 5/2001 | Salas et al. | |
| 6,314,408 B1 | 11/2001 | Salas et al. | |
| 6,421,686 B1 | 7/2002 | Martin, Jr. | |
| 6,728,733 B2 | 4/2004 | Tokui | |
| 7,107,290 B2 | 9/2006 | Davis et al. | |
| 7,127,501 B1 | 10/2006 | Beir et al. | |
| 7,249,314 B2 * | 7/2007 | Walker et al. | ................. 715/205 |
| 7,296,237 B2 | 11/2007 | Crocker et al. | |
| 7,451,236 B2 | 11/2008 | Savitzky et al. | |

(Continued)

OTHER PUBLICATIONS

"Using Adobe Acrobat.Com", Adobe Acrobat.Com., Updated May 14, 2009, copyright 2009 Adobe Systems Incorporated, pp. 1-17.

(Continued)

*Primary Examiner* — Dangelino Gortayo
(74) *Attorney, Agent, or Firm* — Finch & Maloney PLLC

(57) ABSTRACT

Methods, systems, and apparatus, including computer programs encoded on a computer storage medium, include sending a first rich internet application over a data network from a web server to a first client device and to a second client device. The web server is adapted to allow multiple client devices to collaboratively access one or more electronic documents formatted for any one of multiple different applications, including the first rich internet application. A first electronic document, which includes multiple document elements, is sent from the web server to the first client device and to the second client device. A document update received from the first client device includes identifications of one or more of the document elements and a requested action with respect to the one or more identified document elements. The received document update is verified to determine whether the requested action complies with the document schema and whether the first client device is authorized to initiate the requested action. One or more updated document elements for the first electronic document is generated based at least in part on the verified document update and automatically sent to the second client device over the data network.

27 Claims, 12 Drawing Sheets

(56) References Cited

U.S. PATENT DOCUMENTS

| | | | |
|---|---|---|---|
| 7,454,402 B2 | 11/2008 | Spencer et al. | |
| 7,593,943 B2* | 9/2009 | Clarke et al. | 707/999.01 |
| 7,673,006 B2* | 3/2010 | Bhogal et al. | 709/206 |
| 7,792,788 B2* | 9/2010 | Melmon et al. | 707/608 |
| 7,917,584 B2* | 3/2011 | Arthursson | 709/205 |
| 7,933,952 B2* | 4/2011 | Parker et al. | 709/204 |
| 7,941,399 B2* | 5/2011 | Bailor et al. | 707/608 |
| 7,949,633 B1* | 5/2011 | Shaver et al. | 707/620 |
| 7,962,853 B2* | 6/2011 | Bedi et al. | 715/751 |
| 8,010,491 B2* | 8/2011 | Edelstein et al. | 707/638 |
| 8,090,681 B2* | 1/2012 | Lukiyanov et al. | 707/609 |
| 8,121,990 B1* | 2/2012 | Chapweske et al. | 707/695 |
| 2002/0065912 A1 | 5/2002 | Catchpole et al. | |
| 2002/0087476 A1 | 7/2002 | Salas et al. | |
| 2002/0169865 A1 | 11/2002 | Tarnoff | |
| 2002/0174201 A1 | 11/2002 | Ramer et al. | |
| 2003/0014491 A1 | 1/2003 | Horvitz et al. | |
| 2003/0208570 A1 | 11/2003 | Lapidous | |
| 2004/0010720 A1 | 1/2004 | Singh et al. | |
| 2004/0225730 A1 | 11/2004 | Brown et al. | |
| 2005/0079477 A1 | 4/2005 | Diesel et al. | |
| 2005/0165918 A1 | 7/2005 | Wantanabe et al. | |
| 2005/0188090 A1 | 8/2005 | Washburn | |
| 2005/0210114 A1 | 9/2005 | Washburn | |
| 2005/0262225 A1* | 11/2005 | Halpern et al. | 709/220 |
| 2006/0059253 A1 | 3/2006 | Goodman et al. | |
| 2006/0080432 A1 | 4/2006 | Spataro et al. | |
| 2006/0168101 A1 | 7/2006 | Mikhailov et al. | |
| 2006/0195539 A1 | 8/2006 | Nichols et al. | |
| 2006/0230030 A1 | 10/2006 | Volpa et al. | |
| 2006/0253580 A1 | 11/2006 | Dixon et al. | |
| 2006/0265489 A1 | 11/2006 | Moore | |
| 2006/0282520 A1 | 12/2006 | Hickman et al. | |
| 2007/0143472 A1 | 6/2007 | Clark et al. | |
| 2007/0156897 A1 | 7/2007 | Lim | |
| 2007/0162578 A1 | 7/2007 | Bhaskaran et al. | |
| 2007/0162590 A1 | 7/2007 | Campbell et al. | |
| 2008/0065769 A1 | 3/2008 | Curtis et al. | |
| 2008/0068371 A1 | 3/2008 | Sun et al. | |
| 2008/0133748 A1 | 6/2008 | Nicholas | |
| 2009/0013044 A1 | 1/2009 | Stull | |
| 2009/0100178 A1 | 4/2009 | Gonzales et al. | |
| 2010/0223385 A1 | 9/2010 | Gulley et al. | |
| 2010/0235505 A1 | 9/2010 | Gupta et al. | |
| 2010/0306320 A1 | 12/2010 | Leppanen et al. | |

OTHER PUBLICATIONS

David Jared et al., "Systems and Methods for Enabling Voice Communication Between Users of Common Virtual Spaces", U.S. Appl. No. 12/038,656, filed Feb. 27, 2008.
Robert Shaver, "Document Comment Management", U.S. Appl. No. 12/199,249, filed May 12, 2008.
Robert Shaver and Paul Kleppner, "Shared Edit Access of Electronic Content", U.S. Appl. No. 12/119,335, filed May 12, 2008.
Paul Kleppner, "Asynchronous Comment Updates", U.S. Appl. No. 12/119,350, filed May 12, 2008.
Robert Shaver, "Comment Presentation in Electronic Documents", U.S. Appl. No. 12/119,397, filed May 12, 2008.
Michael Kraley, "Item List in Electronic Content", U.S. Appl. No. 12/119,407, filed May 12, 2008.
Michael Kraley, "History-Based Archive Management", U.S. Appl. No. 12/119,421, filed May 12, 2008.
Robert Treitman et al., "Segmented Scroll Bar", U.S. Appl. No. 12/119,425, filed May 12, 2008.
Danielle Deibler, "Extemporaneous Awareness of Rich Presence Information for Group Members in a Virtual Space", U.S. Appl. No. 12/239,672, filed Sep. 26, 2008.
Andrew Marc Greene, "Dictionary Compilations", U.S. Appl. No. 12/172,120, filed Jul. 11, 2008.
Marissa Dulaney and Robert Shaver, "Tracking Database Changes", U.S. Appl. No. 12/240,466, filed Sep. 29, 2008.
Robert Shaver, "Electronic Content Change Tracking", U.S. Appl. No. 12/247,905, filed Oct. 8, 2008.
Todd Rein et al., "Collaborative Editing Operations", U.S. Appl. No. 12/336,385, filed Dec. 16, 2008.
"Cocomo Developer Guide (BETA 0.9)", Acrobat.Com Beta, PDF Creation Date Nov. 10, 2008, Copyright 2007-08 Adobe Systems Incorporated, 59pp.
EMC Documentum Center Stage, "Setting the New Standard for Extended Enterprise Collaboration", Copyright 2009 EMC Corporation, Datasheet H4690, pp. 4.
EMC Documentum eRoom Enterprise, "Collaboration and Content Management: Addressing a Full Range of Content and Process Needs", Copyright 2007 EMC Corporation, Datasheet S12040407V7, pp. 2.
eRoom to Center Stage Content Migration, "Crown Partner's RedCarpet Migration Utility will Quickly and Easily Transition EMC Documentum eRoom Content to its New Collaboration Environment—Centerstage", Copyright 2008, 2009 EMC Corporation, Solutions Overview H46041, pp. 3.
eRoom Viewer for Microsoft Project, Copyright 2008, EMC Corporation, Datasheet H3103, pp. 2.
EMC Documentum eRoom, "Extending the Power and Value of Team Collaboration with Information Protection", Copyright 2008 EMC Corporation, Datasheet H3098, pp. 4.
EMC Documentum eRoom.net, "Enabling Collaboration Across the Enterprise", Copyright 2008, EMC Corporation, Datasheet H3102.1, pp. 2.
EMC Documentum IRM Services for eRoom, "Protect and Control your Collaboration Workspace", Copyright 2006 EMC Corporation, Datasheet S11291106v1, pp. 2.
IBM Lotus Productivity Tools User Guide, Copyright 2007 IBM Corporation, pp. 47.
Lotus Symphony, Version 8.0.1, IBM Productivity Tools Development Guide, 2nd edition 2007, Copyright IBM Corp. 2003, 2008, pp. 91.
IBM Lotus Notes and Lotus Domino Software, What's new in version 8.5, dated Jan. 2009, Copyright IBM Corp. 2009, LOF10860-USEN-03, pp. 2.
"Using Adobe Buzzword", Updated May 14, 2009, Copyright 2009 Adobe Systems Incorporated, pp. 35.
"Extensible Messaging and Presence Protocol", Retrieved from "http://en.wikipedia.org/wiki/Extensible_Messaging_and_Presence_Protocol" Wikipedia, last modified Apr. 24, 2009, pp. 6.

* cited by examiner

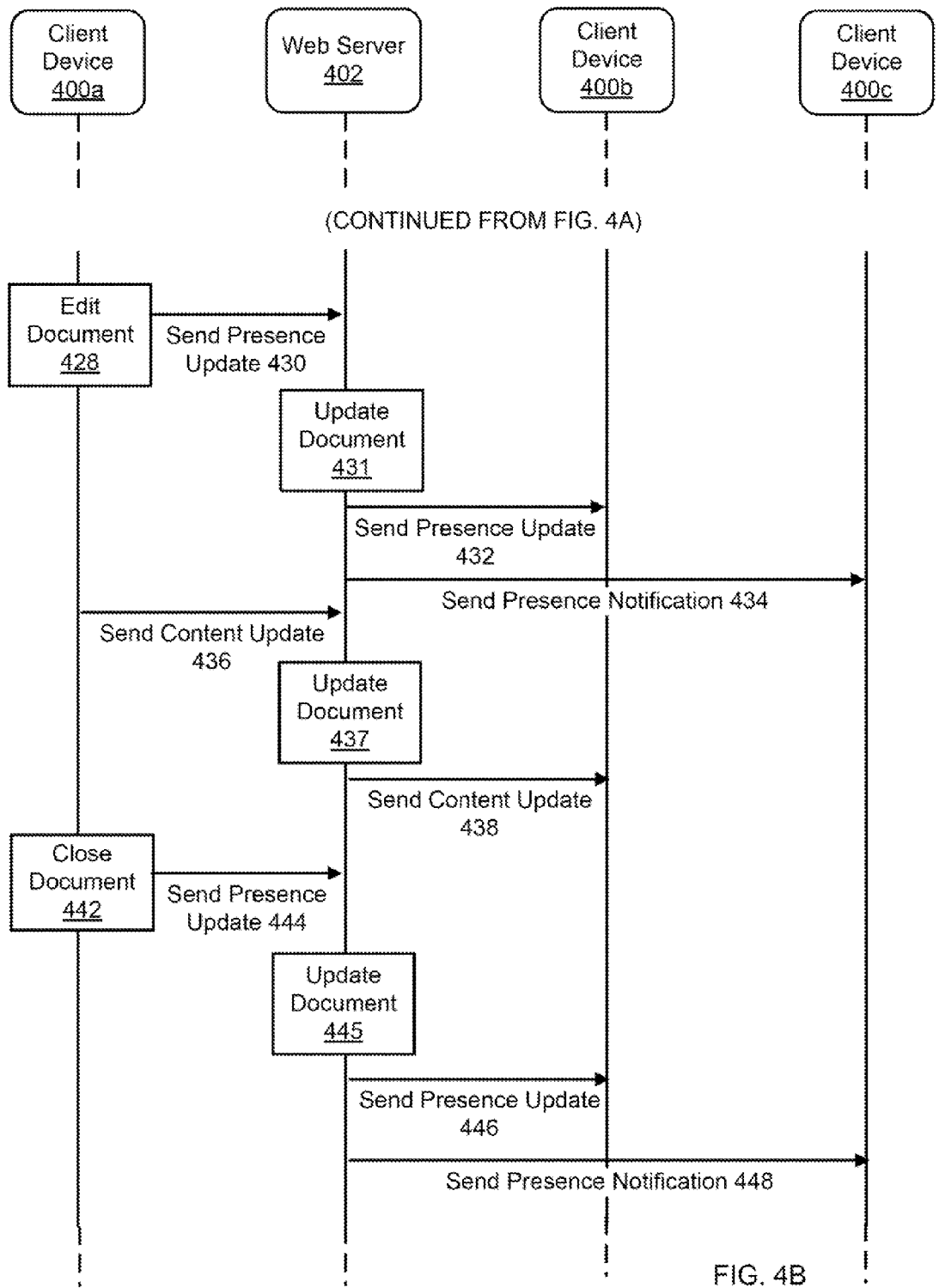

WEB-BASED COLLABORATION FOR EDITING ELECTRONIC DOCUMENTS

BACKGROUND

This specification relates to editing electronic documents in a collaborative manner using a web-based communication system. Conventional web-based systems allow multiple users to collaborate on a particular type of document. For example, existing online word processor systems allow multiple users to collaborate on a word processing document. In such systems, a word processing client application communicates with a server system that is configured for managing word processing documents. The client application can refresh the document on the client device by requesting the latest version of the document from the server. The client application can also modify the word processing document and send the updated word processing document to the server. When the server receives the updated document, the server can store the updated word processing document as an updated document version.

SUMMARY

This specification describes technologies relating to a web-based environment for collaborative editing of electronic documents.

In general, one innovative aspect of the subject matter described in this specification can be embodied in methods that include sending computer-readable instructions over a data network from a web server to a first client device. The computer-readable instructions, when executed by a processor on a client device are adapted to cause the processor to run a first rich internet application. The web server is adapted to allow multiple client devices to collaboratively access one or more electronic documents formatted for any one of a plurality of different applications, including the first rich internet application. The computer-readable instructions are sent over the data network from the web server to a second client device. A first request for a first electronic document is received by the web server over the data network from the first client device. The first electronic document includes multiple document elements formatted according to a first document schema for the first rich internet application. The first electronic document is sent from the web server over the data network to the first client device in response to the first request. A second request for the first electronic document is received by the web server over the data network from the second client device. The first electronic document is sent from the web server over the data network to the second client device in response to the second request. A document update is received over the data network at the web server from the first client device. The document update includes an identification of one or more document elements of the first electronic document. The document update also includes an identification of a requested action with respect to the one or more document elements. At the web server, the received document update is verified to determine whether the requested action complies with the first document schema and whether the first client device is authorized to initiate the requested action. One or more updated document elements for the first electronic document are automatically sent to the second client device over the data network. Each updated document element is generated based at least in part on the verified document update. Other embodiments of this aspect include corresponding systems, apparatus, and computer programs, configured to perform the actions of the methods, encoded on computer storage devices.

These and other embodiments can each optionally include one or more of the following features. The web server includes multiple server devices operating as a server cluster, and the data network includes a publicly-accessible data network. The received document update includes a first document update. The requested action includes a first requested action. A second document update is received over the data network at the web server from the second client device prior to receiving the first document update. The second document update includes a second requested action for one or more document elements of the first electronic document. Operations are executed to verify whether the first requested action conflicts with the second requested action. The electronic document identifies a hierarchical structure of the document elements, where at least one of the document elements has a child element according to the hierarchical structure. A document subscription is received from a third client device prior to receiving the document update. The document subscription includes a request for a notification of document updates for the first electronic document. An update notification is sent to the third client device based on the verified document update. The first request identifies a selected subset of elements of the first electronic document. Sending the first electronic document to the first client device includes sending the selected subset of elements to the first client device. The requested action includes deleting an element of the first electronic document, creating a new element of the first electronic document, and/or modifying an element of the first electronic document. The client applications include a word processing application, a spreadsheet application, and/or a presentation application. The first electronic document is retrieved from a database to the web server prior to sending the first electronic document to the first client device. Each document element of the retrieved first electronic document includes an identification of a version of the document element. The updated document element for the first electronic document is stored in the database. Each updated document element includes an identification of a new version of the document element. The document update is received and the updated document element is sent while the web server is providing collaborative access to the first electronic document for the first client device and the second client device. Sending the first electronic document from the web server over the data network to the first client device includes sending less than all of the document elements of the first electronic document to the first client device. The document update is generated based on a user interaction with the first client device. The document update includes a first document update. A second document update is received from the second client device after receiving the first document update. The second document update is verified. Verifying the first document update includes verifying the first document update prior to receiving the second document update. Verifying the second document update includes determining whether a second requested action included in the second document update conflicts with a first requested action included in the first document update. Presence data is received from the first client device. The presence data includes an identification of at least one of the document elements of the first electronic document and an identification of a status of the first electronic document for the first client device. A presence object is sent to the second client device based on the presence data received from the first client device. The first rich internet application is configured to communicate with the web server independent of a web browser application. The first rich internet application is configured to utilize a web browser application installed on a client device to facilitate communication with the web server. The first rich internet application is adapted to generate a graphical user interface for presentation within a web browser application installed on a client device. The first client device includes a handheld mobile device.

Particular embodiments of the subject matter described in this specification can be implemented so as to realize one or more of the following advantages. A document management infrastructure allows users to collaborate on different types of electronic documents, including word processing documents, spreadsheet documents, presentation documents, and/or others. Web-based systems and techniques allow hundreds, thousands, or more users at different locations to collaboratively work on electronic documents. Updates for electronic documents and/or update notifications are automatically sent to users based on information maintained by a web server. Updates for electronic documents are automatically stored by the web server, for example, in a database. A rich internet application allows substantial document editing operations to be executed locally on a client device, while allowing other substantial document collaboration operations to be executed by a remote server. The rich internet application can provide the rich functionality of an installed application, while utilizing a remote server to facilitate document versioning, document storage, communication with other client devices, document authentication, document access control, and other tasks. The rich internet application can parse an electronic document to facilitate efficient communication, storage, and/or distribution of document updates. Each user, while working on a document, is automatically provided presence information regarding other users who are accessing, viewing and/or editing the same document, which may allow more efficient and/or better quality document collaboration.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A and 4B are signaling and flow diagrams illustrating an example process for distributing presence information in a document collaboration system.

Like reference numbers and designations in the various drawings indicate like elements.

DETAILED DESCRIPTION

A web-based document collaboration system provides one or more users with the ability to work collaboratively to create and/or edit one or more electronic documents. Document editing applications as well as documents can be distributed to users through a web based-interface, thereby providing users with the ability to edit a shared document using a common set of software tools.

A web-based document collaboration system can provide users with the ability to access documents over a publicly accessible data network (e.g., the Internet) and edit those documents collaboratively and/or concurrently. For example, two or more users can edit the same document at the same time. Information relating to the viewing and/or editing activities of one user can be sent over the network to other users. The information sent to the other users may notify the other users of who is viewing and/or editing the documents, what edits are being made, and/or where in the document the edits are being made. The information sent to the other users may include an updated version of the document or an updated version of a document element. The information sent to the other users may help resolve concurrency issues that can arise if two or more users attempt to edit the same section of a commonly accessible document.

Figure 1A:
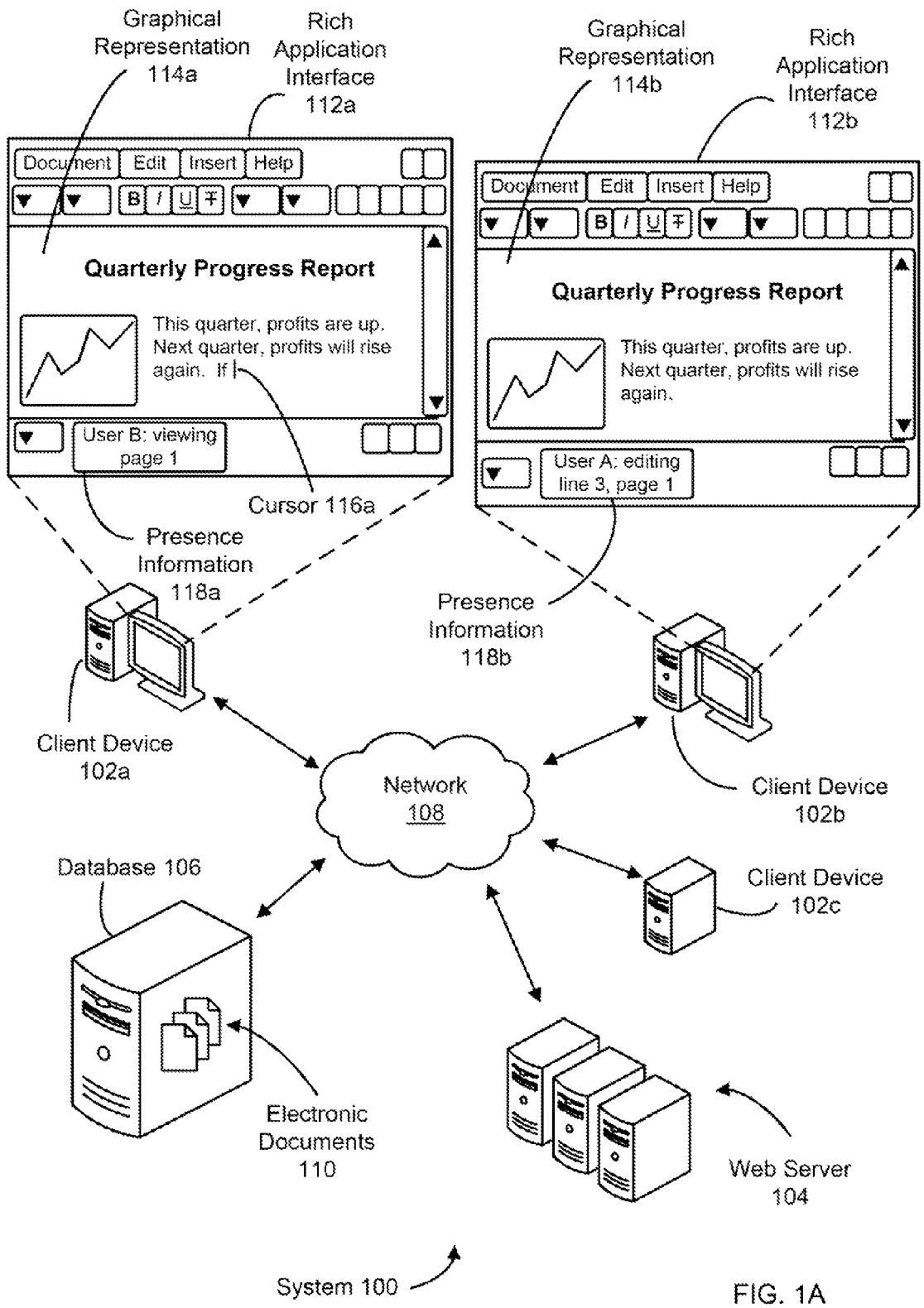
FIG. 1A depicts an overview of an example document collaboration system.

As shown in FIG. 1A, an example document collaboration system 100 includes a number of client devices 102a, 102b, and 102c, a collection of web servers 104, and a database 106. The client devices 102a-102c, the web server 104, and the database 106 are communicatively coupled through a network 108, such as the Internet. In some embodiments, the client devices 102a-102c can be personal computers, personal digital assistants, cellular or "smart" phones, netbooks, or other electronic devices that are capable of communicating with the web server 104.

In use, the web server 104 provides the clients devices 102a-102c with collaborative access to a collection of electronic documents 110. In some embodiments the web server 104 can be a collection of web servers, such as a server farm or a web server cluster. The database 106 can include a single table, multiple tables, or multiple databases, and can be a single file, or multiple files stored at a single or multiple locations.

Document editing software on the client devices 102a-102c provides viewing and editing access to the electronic documents 110. An electronic document may, but need not, correspond to a file. A document may be stored in a portion of a file that holds other documents, in a single file dedicated to the document in question, or in multiple coordinated files.

In the embodiment shown in FIG. 1A, the document editing software executed by the client devices 102a-102c is a rich internet application (RIA). An RIA includes software that executes on a client device and relies on interactions with an external server for at least some of its functionality. In some cases, basic functionality of an RIA makes substantial use of both local execution of instructions on the client device and communications with an external server over the Internet or another type of network.

In the example shown, the RIA running on the client devices 102a-102c relies on local execution of operations for some aspects of the RIA's functionality and relies on interactions with the web server 104 for other aspects of the RIA's functionality. For example, the RIA relies at least partially on the web server 104 for document storage, document versioning, and document update distribution. The RIA also relies at least partially on the web server 104 for functionality associated with document access control, document encryption, document authentication, presence data distribution, and other functions. In some implementations, the RIA running on a client device 102 communicates with the web server 104 through a web browser application running on the client device 102. In other implementations, the RIA communicates with the web server 104 independent of a web browser application. The RIA may be downloaded to the client device 102 from the web server 104 upon use, each time the RIA is accessed and/or opened on the client device 102. Alternatively, the RIA may be downloaded and installed on the client device for more permanent use, for example, to be accessed and/or opened multiple times on the client device.

While some aspects of an RIA rely on interactions with an external server, other aspects of the RIA function independent of the external server, relying only on local execution of instructions on the client device. For example, an RIA typically generates a rich user interface based on local execution of instructions on the client device. The application interface generated by the RIA may be presented on a display of the client device through a web browser application or otherwise. In some implementations, an RIA facilitates user interactions through a standalone application interface independent of a web browser application. In the example shown, the RIA running on client device 102a generates the rich application interface 112a, and the RIA running on client device 102b generates the rich application interface 112b. In addition to providing the rich application interfaces 112a and 112b, the RIA also executes instructions locally on the client device to facilitate other aspects of the RIA's functionality. For example, the RIA executes instructions locally to edit document content, detect and interpret document elements, generate new document elements (including presence data objects, content data objects, and/or metadata objects), and/or to perform other functions. Although an RIA relies on server interactions for some of its functionality, the RIA can provide a rich user experience. For example, a rich internet word processing application can allow a full range of word processing capabilities.

The RIAs running on client device 102a and 102b allow the client devices 102a and 102b to collaboratively access one of the electronic documents 110. As the electronic documents 110 are edited, changes and updates to the electronic documents are communicated to, and distributed from the database 106. These operations are discussed in additional detail in the descriptions of FIGS. 2A-5B.

The rich application interface 112a includes a graphical representation 114a of one of the electronic documents 110, a cursor 116a, and a presence information pane 118a. In some embodiments, the rich application interface can be adapted for editing a particular one of various types of electronic documents and files such as word processing documents, spreadsheets, presentations, desktop publishing, graphics, videos, animations, audio, software source code, or other types of electronic documents. The rich application interface 112a also includes various controls (not numbered) that may be commonly used to edit the type of the electronic document 110 being edited. For example, the rich application interface 112a may include text formatting and layout controls for editing word processing documents, mathematical operations controls for spreadsheet documents, or layout and transition effects controls for presentation slideshow documents. Likewise, the rich application interface 112b includes a graphical representation 114b of one of the electronic documents 110, a presence information pane 118b, and various controls (not numbered) that may be commonly used to edit the type of the electronic document 110 being edited.

The presence information panes 118a and 118b display information indicative of what other users are currently doing relative to the selected document 110. In the illustrated example, the first client 102a is shown as editing one of the documents 110, and the user has appended the word "If" to the end of the selected document 110 as displayed in the graphical representation 114a. The second client 102b is shown viewing the same document 110, and the first user can see an indication of this fact in the presence information pane 118a. Likewise, the presence information pane 118b can indicate to the second user that the first user is currently editing the document 110 at line 3, page 1. In some implementations, the position of the cursor 116a may be used to determine what the first user is editing. As shown in the example of FIG. 1A, the cursor 116a is located on the third line of page one, where the first user has added the word "If" to the paragraph visible in the graphical representation 114a, and the position of the cursor 116 is indicated in the presence information pane 118b.

A third user can collaborate on one or more of the electronic documents 110 through the client device 102c. For example, the first, second, and third users may all work on the selected document 110 at the same time, and information pertaining to one or more user's activities may be displayed to the other users through modules such as the presence information panes 118a and 118b. Although the system 100 is depicted as including three of the client devices 102a-102c, the system 100 can include large numbers (e.g., hundreds, thousands, or more) of the client devices 102a-102c and electronic documents 110. As such, in some implementations, the system 100 can support multiple different subsets of users collaborating in real time on different documents (e.g., the electronic documents 110) for different types of applications (e.g., word processing, spreadsheets, presentations, or other types of electronic documents).

Figure 1B:
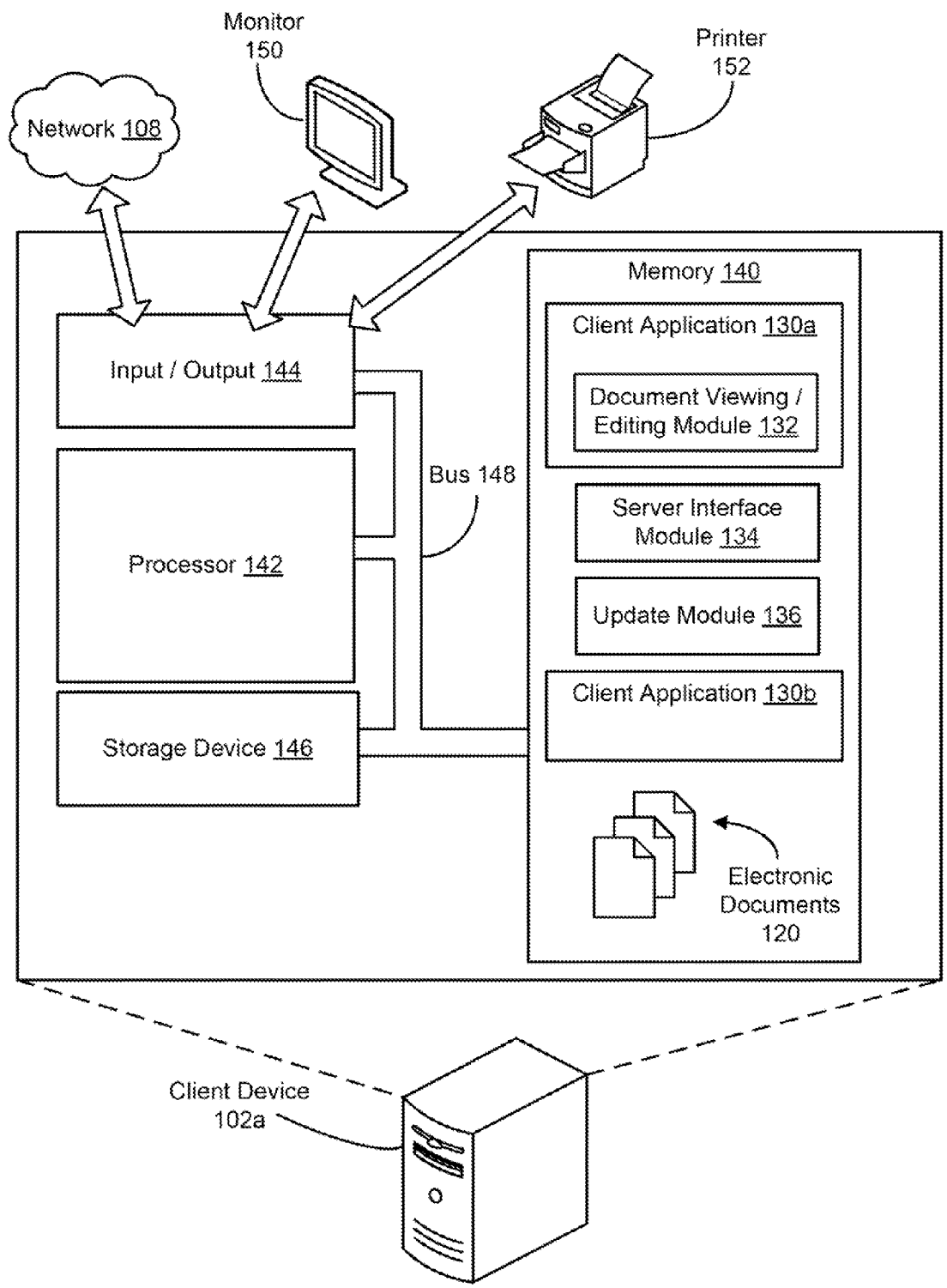
FIG. 1B is a block diagram of an example client device.

FIG. 1B is a block diagram of the example client device 102a. The client device 102a can be a personal computer, a smart phone, a personal digital assistant, a netbook, or other electronic device that is capable of interacting with a web server such as the web server 104 of FIG. 1A. The client device 102a includes a memory 140, a processor 142, an input and output module 144, and a storage device 146 that are communicatively coupled through a bus 148.

The memory 140 can include a collection of one or more electronic documents 120, and one or more client applications 130a and 130b that can be executed by the processor 142. The electronic documents 120 can be formatted according to a document schema for a particular client application. For example, a first one of the electronic documents 120 can be formatted according to a first schema for a word processing application, and a second one of the electronic documents 120 can be formatted according to a second schema for a spreadsheet application. In some implementations, the electronic documents 120 can be local copies of the electronic documents 110, downloaded through the web server 104.

In various implementations, the client applications 130a and 130b can be rich internet applications for word processing, spreadsheets, presentations, graphics, animation, video or audio production, software development, desktop publishing, or other types of software applications. For example, the client application 130a can be a web page editor, and the client application 130b can be a project management application. The client applications 130a and 130b include a document viewing and editing module 132. When executed by the processor 142, the document viewing and editing module 132 generates graphical representations (e.g., the graphical representations 114a and 114b of FIG. 1A) of the electronic documents 120, that can be displayed on a display device such as the monitor 150. The document viewing and editing module 132 receives document edits and updates from a user-interface device, such as a keyboard or a mouse. The document viewing and editing module 132 can provide the input and feedback logic that enables users to interact with the electronic documents 120.

The memory 140 also includes a server interface module 134 and an update module 136 that can be executed by the processor 142. The server interface module 134 receives data from and sends data to the web server 104 through the input and output module 144. For example, the server interface module 134 can receive and send documents, document elements, presence data objects, and other data to and from the web server 104.

The update module 136 generates updates for the electronic documents 120, and information describing updates to the electronic documents 120 can be sent to the web server 104. In some implementations, a document update can include adding or deleting a page, slide, cell, or other elements of the electronic documents. A document update can include generating or editing a presence object. In some implementations, the update module 136 can include an encryption/decryption module, an authentication module (e.g., for supporting password-based authentication), or other modules that can perform security and authentication tasks.

In the embodiment shown, the server interface module 134 and the update module 136 are shared resources that can be utilized by both of the client applications 130a and 130b on the client device 102a. The client device 102a may include additional shared resources that are used by multiple client applications. The shared resources, including modules 134 and 136 can be downloaded and/or installed on the client device 102a with one or both of the client applications 130a and 130b, or they can be downloaded and installed independent of the client applications 130a and 130b. Sharing functional modules among multiple client applications may reduce computational resources consumed on the client device 102. In some embodiments, each client application has its own server interface module 134 and/or its own update module 136. For example, the client application 130a could include a first server interface module and first update module that are both adapted for use by the client application 130a, and the client application 130b could include a second server interface module and second update module that are both adapted for use by the client application 130b.

The input and output module 144 includes the logical and physical interfaces that can couple the client device 102a to various external devices, such as the network 108, the monitor 150, a printer 152, or other devices (e.g., keyboards, pointing devices, touch screens, speakers). As such, the input/output module 144 can facilitate, for example, interactions between one of the client applications 130a or 130b and a user, interactions between one of the client applications 130a or 130b and a display device, interactions between the server interface module 134 and the web server 104 (of FIG. 1A), and/or other interactions.

The storage device 146 stores data that is used for the operation of the client device 102a. For example, the storage device 146 may store operating system code, configuration data, cached data, local copies of the client applications 130a and 130b or the electronic documents 120, the modules 134-136, cryptographic keys, security certificates, or other information that may be used by the client device 102a. In some embodiments, the storage device 146 can be a hard disk, flash memory, CD-ROM, DVD-ROM, floppy disk, RAM disk, or other type of persistent data storage device.

Figure 1C:
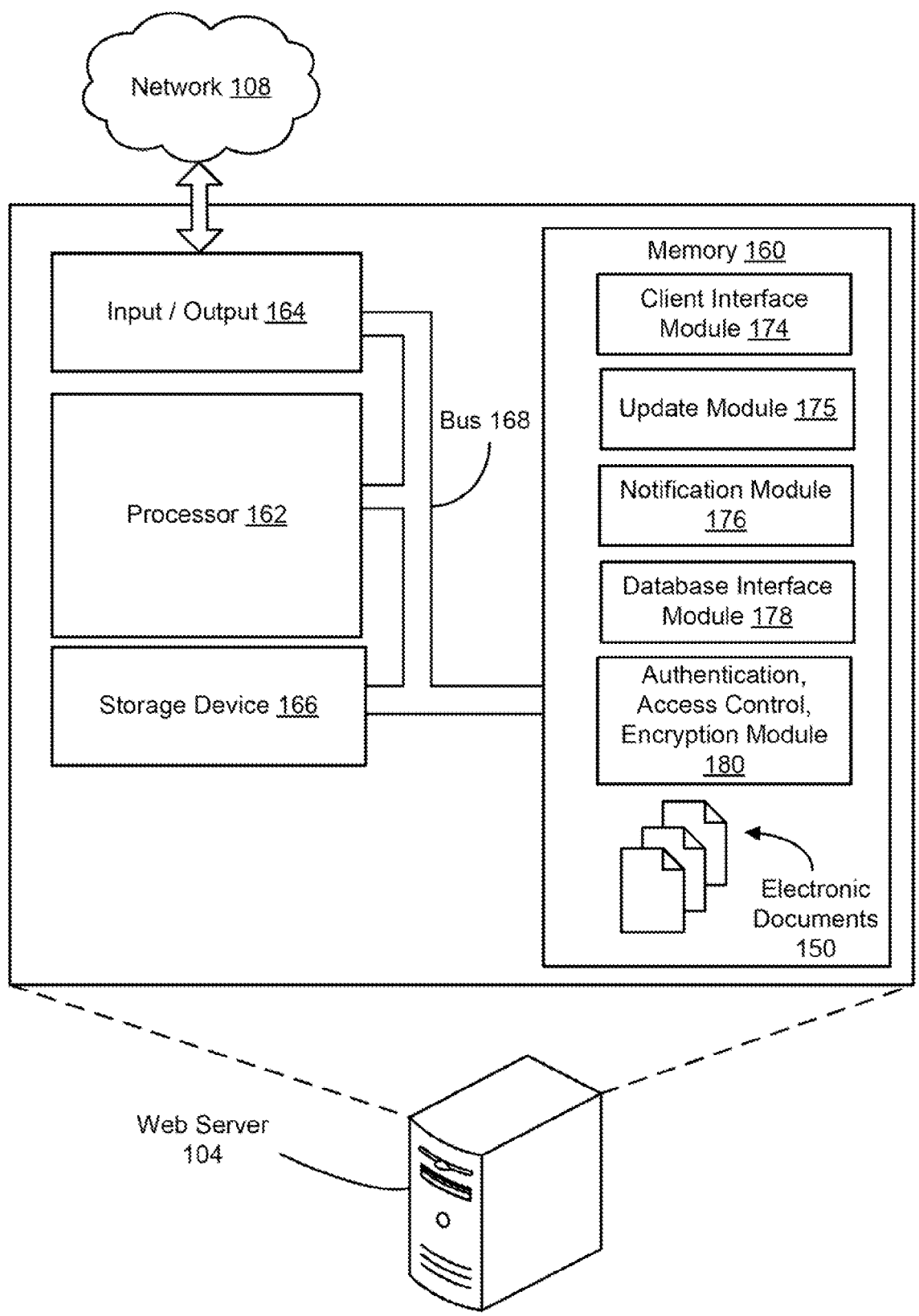
FIG. 1C is a block diagram of an example web server.

FIG. 1C is a block diagram of an example of the document collaboration web server 104. In some embodiments, the web server 104 can be a single or multiple computers, such as a web farm or computing cluster, or other electronic devices that can respond to requests from the client devices 102a-102c of FIG. 1A. The web server 104 includes a memory 160, a processor 162, an input and output module 164, and a storage device 166 that are communicatively coupled through a bus 168.

The memory 160 includes a collection of software modules, including a client interface module 174, an update module 175, a notification module 176, a database interface module 178, and an authentication, access control, and encryption module 180 that can be executed by the processor 162. The client interface module 174 receives data from and sends data to devices, such as the client devices 102a-102c, through the input and output module 164 and the network 108.

The memory 160 also includes a collection of electronic documents 150. In some implementations, each of the electronic documents 150 can be collaboratively accessed and edited by one or more users at substantially the same time. For example, one of the electronic documents 150 can be a word processing document that two or more users can edit concurrently using two or more of the client devices 102a-102c. In some implementations, the electronic documents 150 are not persistently stored on the client devices 102a-102c. For example, while a local copy of the electronic documents 150 (e.g., the electronic documents 120) may be used on the client devices 102a-102c, the centralized copy (e.g., the more widely accessible master copy) is stored and updated as one of the electronic documents 150. In some implementations, the electronic documents 150 can be stored on the web server 150, for example, in the storage device 166. In other implementations, the web server 104 may provide access to electronic documents stored elsewhere. For example, the web server 104 may act as a gateway between the client devices 102a-102c and the electronic documents 110 stored in the database 106 or in other locations.

The update module 175 generates document updates (e.g., updated content and presence objects) that are sent to users. For example, when a first user sends an update, which can include presence or content information, the update module 175 can generate an updated document element or a presence object based on the information received from the first user. The update module 175 can then send the updated document element or presence object to other client devices, for example, all other users who are viewing copies of the same one of the electronic documents 150.

The notification module 176 sends notifications to the users who have subscribed to updates pertaining to one or more of the electronic documents 150. In some implementations, the notification may or may not include information about the content of the update. For example, when a first user modifies one of the electronic documents 150, the notification module 176 can send a notification to a second user that the first user has modified the electronic document 150, but the notification may or may not carry information that describes the modification itself depending on the users' and the electronic document's 150 configurations and access privileges.

For example, when a first user adds a second user as a participant for one of the electronic documents 150 (e.g., to grant the first user permission to access the electronic document 150), the notification module 176 can send a notification to the second user to alert the second user that he or she now has access to the electronic document 150. In another example, the first user can send presence data to the web server 104, and the notification module 176 can send a notification to the second user indicating that the first user is editing or viewing the electronic document 150. In some implementations, users can browse or search for documents and subscribe to selected documents and/or request permission to access and/or edit selected documents, depending on a level of security associated with each document.

The database interface module 178 provides functions for interacting with a database, such as the database 106. In some implementations, the database interface module 178 can provide an application programming interface (API) that can simplify communications between the database server 106 and the modules 174-176 and 180. For example, the database interface module 178 can provide functions for tasks such as "update user presence," "query a user's security privileges," or other tasks related to storing and retrieving information about document updates.

The authentication, access control, and encryption module 180 provides functions for controlling access to and distribution of the electronic documents 150. The authentication, access control, and encryption module 180 can be implemented as multiple different modules. In some implementations, the authentication, access control, and encryption module 180 can handle the processing of user logins, such as usernames and passwords. For example, a user can request access to one of the electronic documents 150 by using one of the client devices 102a-102c to send the access request to the web server 104. The access request can include a user name and password or other information that identifies the user. When the request is received by the web server 104, the authentication, access control, and encryption module 180 can verify the user's identity (e.g., by querying a user identity database, by looking up user data stored in one or more of the electronic documents 150) to determine the user's identity. The authentication, access control, and encryption module 180 can control access to document content data and document presence data based on access privileges for an electronic document. For example, when a client requests presence data for an electronic document, the web server 104 can determine whether the client is permitted to access the electronic document. If the client is permitted to access the electronic document, the web server 104 can send the client the requested presence data. However, if the client does not have permission to access the electronic document, the web server 104 may deny access to the presence data.

The authentication, access control, and encryption module 180 also uses an authentication protocol to authenticate content element updates received at the web server 104 from the client devices 102a-102c. For example, the client device 102a can send an update of the content of one of the electronic documents 150 to the web server 104. The web server 104 can receive the request and authenticate a content element update and a presence data object included in the request using an authentication protocol (e.g., CHAP, RADIUS, EAP, TACACS). In some implementations, the user's identity can be used to authenticate requests from the user. For example, the user may not have permission to modify one or more of the electronic documents 150, or various subsections thereof, and the web server 104 may use authentication, access control, and encryption module 180 to determine the user's permission level and grant or deny the user's content update request.

The authentication, access control, and encryption module 180 also provides functions for encrypting documents and presence data. For example, the client device 102a can request one of the electronic documents 150 from the web server 104. The web server 104 can respond by engaging the authentication, access control, and encryption module 180 to encrypt the electronic document 150 and presence data according to an encryption protocol (e.g., PGP, SHA, DES, AES, MD5, Diffie-Hellman, RSA, DSA) and send the encrypted information to the client device 102a. An encryption protocol may be used to prevent a third party from accessing the encrypted data, even when the encrypted data is sent over a public communication network, such as the Internet.

The input and output module 164 includes the logical and physical interfaces that can couple the web server 104 to various external devices, such as the network 108, network management devices, monitors, printers, or other devices (e.g., keyboards, mice, touch screens, speakers). As such, the input and output module 164 can facilitate interactions between the client interface module 174 and a client application running on a client device.

The storage device 166 stores data that is used for the operation of the web server 104. For example, the storage device 166 may store operating system code, configuration data, cached data, local copies of the electronic documents 150, the modules 174-180, cryptographic keys, security certificates, or other information that may be used by the client device 104. In some embodiments, the storage device 166 can be a hard disk, flash memory, CD-ROM, DVD-ROM, floppy disk, RAM disk, or other type of persistent data storage device.

The web server 104 may utilize a SAN (storage area network) or NAS (network attached storage) storage device. For example, SAN and/or NAS devices can be used to store electronic documents, rich internet applications, and/or other data for providing a collaborative environment for editing electronic documents. Multiple different types of storage devices may be used in combination.

Figure 2A:
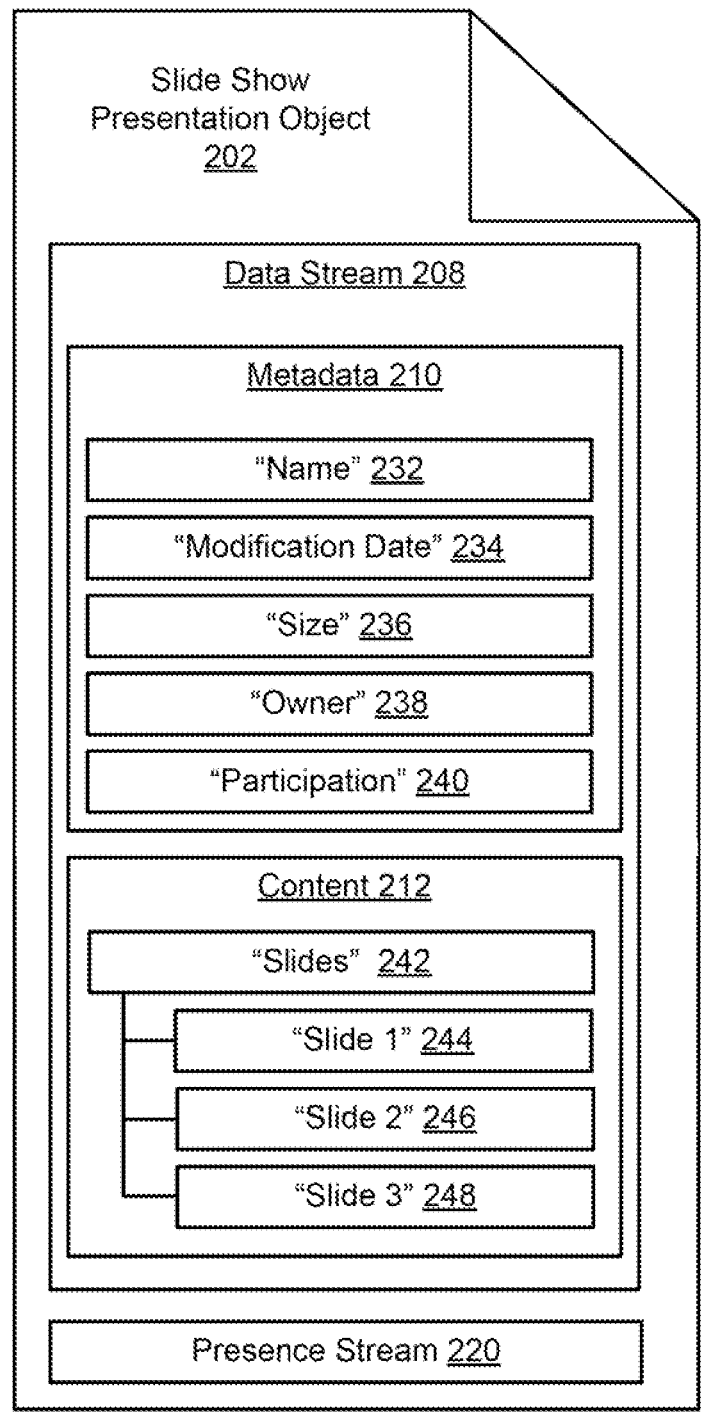
FIG. 2A depicts an example object hierarchy of a slide show presentation object.

FIG. 2A depicts an example object hierarchy of a slide show presentation object 202. In use, the slide show presentation object 202 provides a document schema that can be used to store an electronic document (e.g., individual members of the collection of electronic documents 110, 120, 150). Generally, an electronic document (e.g., the slide show presentation object 202, or another type of electronic document) is an instance of a class. A class can be defined by a document schema. A class can be registered on a web server, and the web server can validate requested actions on an electronic document (e.g., modification, creation, and/or deletion of a document element, etc.) against a document schema.

Thus, a web server can receive a document update that identifies a requested action for a document or a document element, and the web server can validate the requested action against a document schema. For example, the web server can validate the requested action by verifying that a received data type is a data type that is permitted by a document schema. As another example, the web server can validate the requested action by verifying that a new document element is a type of element permitted by the document schema. Document schemas can vary according to the type of content, metadata, and/or presence information they allow. For example, a document schema for a spreadsheet document may allow content including a collection of cells, rows, and/or columns. In another example, a document schema for a word processing application may allow content including pages, sentences, sections, paragraphs, or other elements of the document.

The slide show presentation object 202 includes multiple elements. In the illustrated example, the slide show presentation object 202 includes a data stream element 208, which in turn includes a metadata element 210 and a content element 212. The data stream element 208 represents persistent data (e.g., document properties and content, rather than real-time data). The metadata element 210 is configured according to a schema for storing document properties in various sub-elements. A name element 232 can store the name of the electronic document, while a modification date element 234 can store the date and time that the document was last updated. A size element 236 can store a value that describes the number of bytes used to describe the document's content, and an owner element 238 can store the identity of the user who owns the document. A participation element 240 can store information that describes which users have read, write, modify, delete, or other privileges for the object 202.

The content element 212 is configured according to a schema for storing the content of the electronic document. Document elements can be defined in a hierarchical structure, such as a tree structure. Document elements can have named members. The members of a document element can include local members, which are scalar data types (e.g., string, integer, Boolean, float, or another type). The members of a document element can include a list, which is a local member of the element that holds a variable number of scalar values. The members of a document element can also include child members which are themselves subordinate document elements. The members of a document element can also include collection members, which hold multiple child elements. Each child element may also include metadata. For example, each element may include information relating to a version number, a modification date, an owner of the document element, and/or other data.

In the illustrated example of the slide show presentation object 202, the content element 212 includes a slides element 242. The slides element includes a collection of subordinate slide elements 244, 246, and 248. Each slide element 244, 246, and 248 represents a slide of a presentation. For example, each slide may include text, graphic, animation, formatting, and/or other data for presenting a slide of a slide show presentation. Each of the slides 244-248 may include additional local members, child members, collection members, and/or other data that is not illustrated in FIG. 2A. In some implementations, each of the slides 244-248 may include information that describes the layout and content of an individual presentation slide, and the slides element 242 may include information that applies generally to all its sub-elements. For example, the slides element 242 may store configuration information describing how all the slides should look (e.g., screen aspect ratio, theme, color palette, fonts, manual or automatic advancement). As another example, each slide 244-248 may include additional and/or different information relating to how that individual slide should look.

Figure 2B:
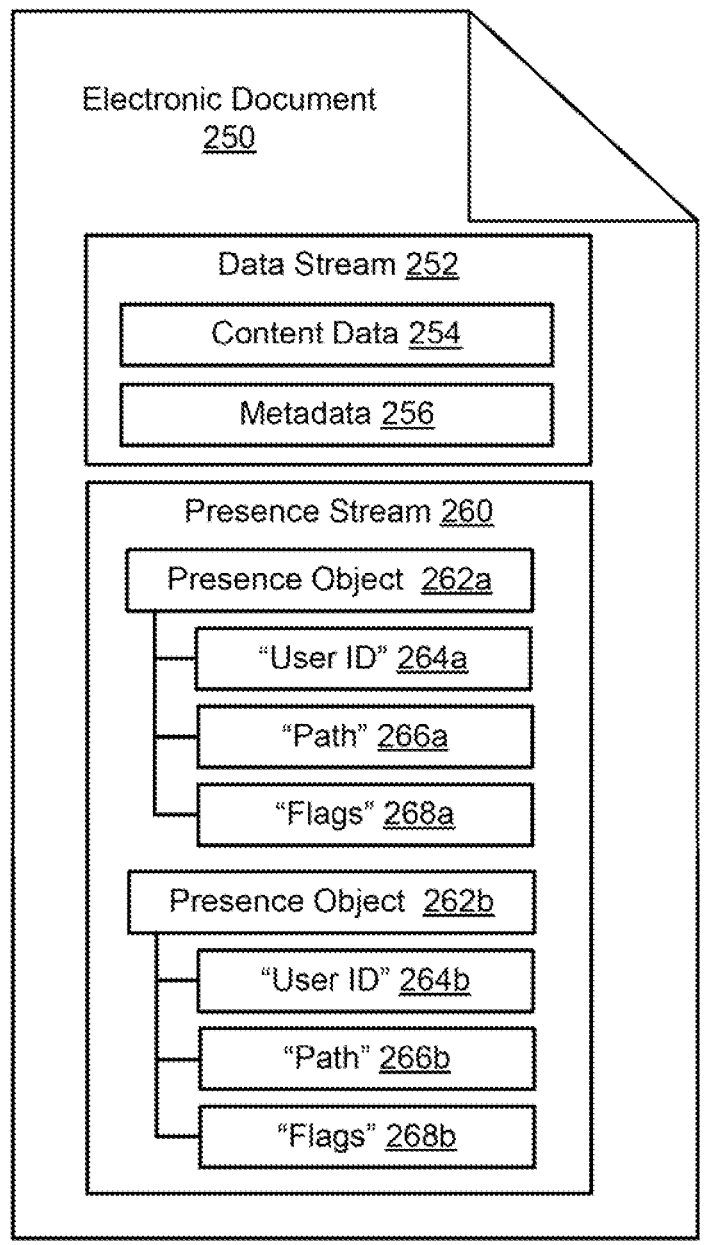
FIG. 2B depicts an example object hierarchy of an electronic document object.

The slide show presentation object 202 also includes a presence stream element 220. The presence stream element 220 generally represents ephemeral data, as opposed to persistent data, and is discussed in the description of FIG. 2B. Some presence information may additionally be stored in the document more permanently as persistent data (e.g., to indicate who has previously accessed a document). FIG. 2B depicts an example object hierarchy of an electronic document object 250. In some implementations, the electronic document 250 may be one of the electronic documents 110, 120, 150, or 202. The electronic document includes elements such as a data stream element 252 and a presence steam element 260. The data stream element 252 is illustrated in FIG. 2B as a collapsed version of the data stream element 208. At a high level, the data stream element 252 includes a content data element 254 and a metadata element 256 which can be equivalent to the elements 210 and 212.

The presence stream element 260 is configured according to a schema for substantially real-time user presence data. In some implementations, the presence stream element 260 may essentially identical to the presence stream element 220. The presence stream includes a collection of one or more presence objects, such as a presence object 262a and 262b. Each of the presence objects 262a and 262b represents an individual user or other entity that is viewing, editing, or otherwise accessing the electronic document 250. The presence objects 262a and 262b include a user ID element 264a and 264b, a path element 266a and 266b, and a flags element 268a and 268b. The presence objects 262a and 262b and/or any of their associated sub-elements, can be modified, updated, created, and/or deleted based on user interactions with a client device and/or based on data received over a data communication network.

The user ID elements 262a and 262b hold data that identifies a user who is "present" on the document (e.g., viewing, editing, and/or otherwise accessing the document). In some implementations, a user's presence may be automatically cleared if no user activity has been detected (e.g., by the client devices 102a-102c or the web server 104) for predetermined amount of time or if the session is terminated.

The presence path elements 266a and 266b specify the element or elements the user is viewing or working on. In some implementations, a user can be present on any number of nodes of any number of objects. The flags elements 268a and 268b hold information that describes the user's working status for the electronic document, such as "editing" or "viewing". As such, the flag elements include identifications of the status of the electronic document 250 for the client device. As one example, the status can include a display status of the electronic document 250, indicating whether the electronic document 250 is displayed on a user interface of a client device. As another example, the status can include an editing status of the electronic document 250, indicating whether the electronic document 250 is being edited on the first client device.

For different client applications and/or different document schemas, the presence data can include additional and/or different types of status information relating to the electronic document. In some implementations, the presence data can additionally include information that does not directly pertain to a status the electronic document. For example, the presence information can additionally include a location of the client device (e.g., determined by GPS), a phone number of a phone call in progress, a song being played by the client device, and/or other data that does not directly pertain to a status of the electronic document 250 for the client device.

Figure 3A:
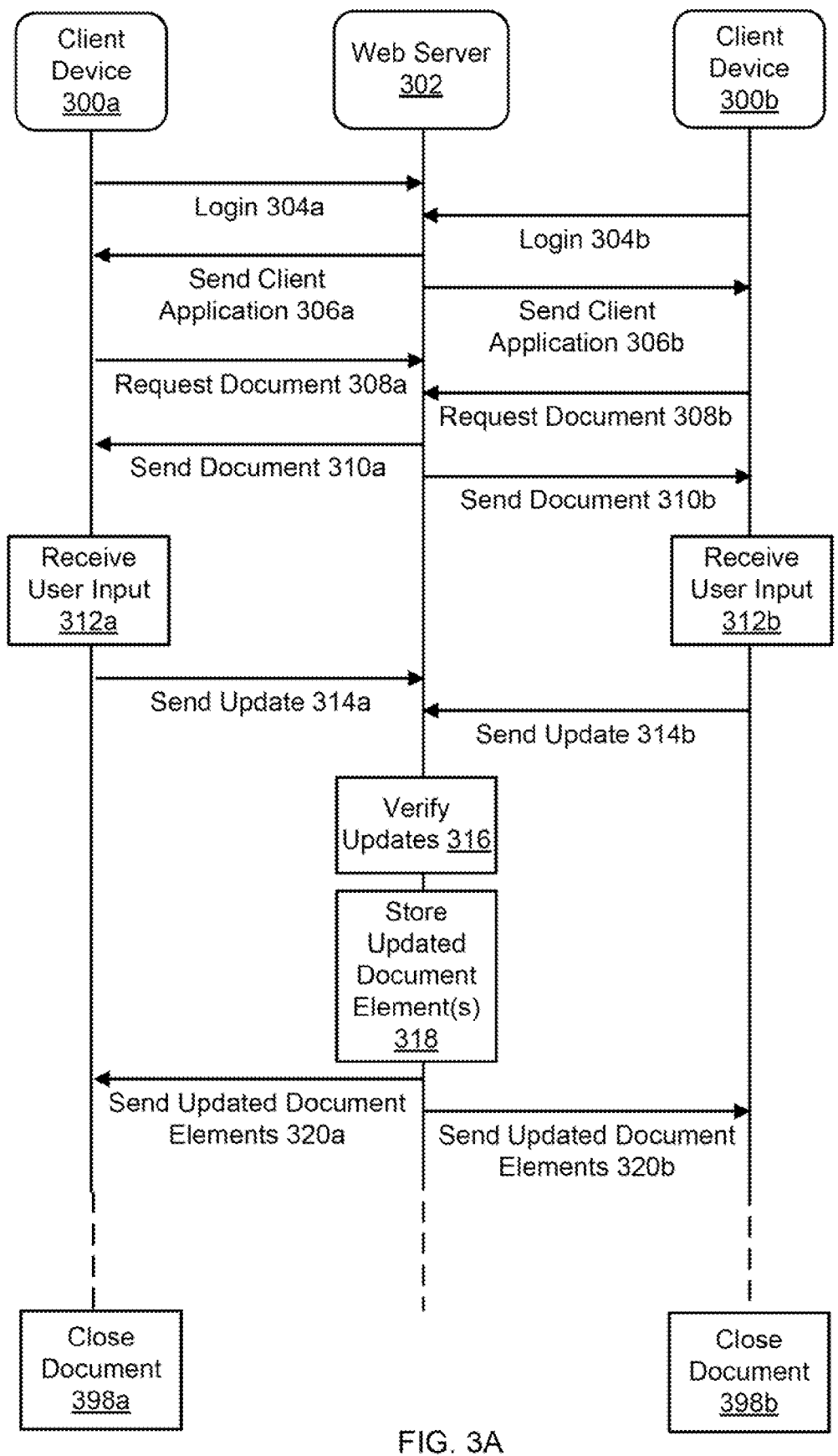
FIG. 3A is a signaling and flow diagram illustrating example interactions for requesting and updating documents in a document collaboration system.

FIG. 3A is a signaling and flow diagram illustrating example interactions for requesting and updating documents in a document collaboration system, such as the document collaboration system 100 of FIG. 1A. At a high level, the illustrated example depicts two users requesting and editing the same document at substantially the same time. A first user uses a client device 300a to login 304a to a web server 302. A second user uses a client device 300b to also login 304b to the web server 302. In some implementations, the client devices 300a and 300b can be the client devices 102a-102c, and the web server 302 can be the web server 104.

In response, the web server 302 sends 306a a client application to the client device 300a, and sends 306b a client application to the client device 300b. The client applications can include one or more rich internet applications. A document request 308a and a document request 308b are sent to the web server 302, in this example, for copies of the same electronic document. The web server 302 responds by sending 310a a copy of the document to the client device 300a and by sending 310b a copy of the document to the client device 300b. The document sent to the client devices may include all or part of the requested document. In some implementations, the document request received by the web server 302 identifies one or more elements of the electronic document, and the response sent to the client device includes only the identified element(s). For example, if the client device 300a requests a spreadsheet document, the web server 302 may send a particular page of the spreadsheet document, rather than the entire document. Moreover, the requests from the client devices may identify multiple different documents and/or individual elements of multiple different documents. In such cases, the web server 302 can send a response that includes elements of multiple different documents.

Both users edit their respective local copies of the received electronic document. The client devices 300a and 300b receive 312a-312b user input from their respective users. The client device 300a sends 314a an update describing the modifications that the first user has made to the document, and the client device 300b sends 314b and update that describes the changes the second user has made. The data sent from the client devices 300a and 300b may include the entire document, or the data sent from the client devices 300a and 300b may include only one element or a subset of elements of the updated document. For example, if the client device 300a modifies a particular slide of a slide show document, the update sent to the web server 302 may include only the updated slide (or the modified sub-elements of the updated slide), and no other elements of the document. As other examples, if the client device 300a modifies a particular cell of a spreadsheet document or a particular page of a word processing document, the update sent to the web server 302 may include only the particular cell or the particular page, rather than the entire document. In some implementations, the update may additionally include presence data, metadata, and/or additional content elements that have not been modified by the client devices. For example, the presence data included in the update may include all or part of an updated presence object associated with the client device 300a, and the metadata included in the update may include updated and/or additional metadata information (e.g., the metadata described with respect to FIG. 2A).

The web server verifies 316 the updates. In some implementations, this can include verifying that each update complies with the document schema. For example, verifying that an update complies with a document schema may include determining whether the data included in the update is formatted properly, determining whether the data included in the update is of proper data type, and/or other determinations. Verifying a document update can also include verifying that the users of the client devices 300a and 300b are allowed to take the requested action (e.g., checking user permissions), verifying that two or more received updates do not conflict (e.g., make sure that the users did not make inconsistent changes to the same line, paragraph, slide, etc.), authenticating the users, performing decryption of encrypted updates, or/or other functions that may be performed to verify a document update.

Once the updates are verified 316, the web server 302 stores 318 the updated document element(s) in a database, such as the database 106, or other data store. Versioning information for the document is also updated to reflect that the document and/or document element has been modified. For example, each document element may include its own versioning information. In some implementations, by associating versioning information with the document updates, users may request older versions of a document, page, slide, paragraph, or other document element.

The web server 302 sends 320a the updated document elements to the client device 300a, and sends 320b the updated document elements to the client device 300b. In some implementations, the updates are sent 320a-320b automatically. For example, the client devices 300a and 300b may not make requests for the updates; rather, the web server 302 may determine which of the client devices 300a and 300b have users working on the document, and determine which of the client devices 300a and 300b to send updates to (e.g., based on presence data in the presence stream of the electronic document). The client devices 300a and 300b continue to operate in a similar manner until their respective documents are closed 398a-398b.

Figure 3B:
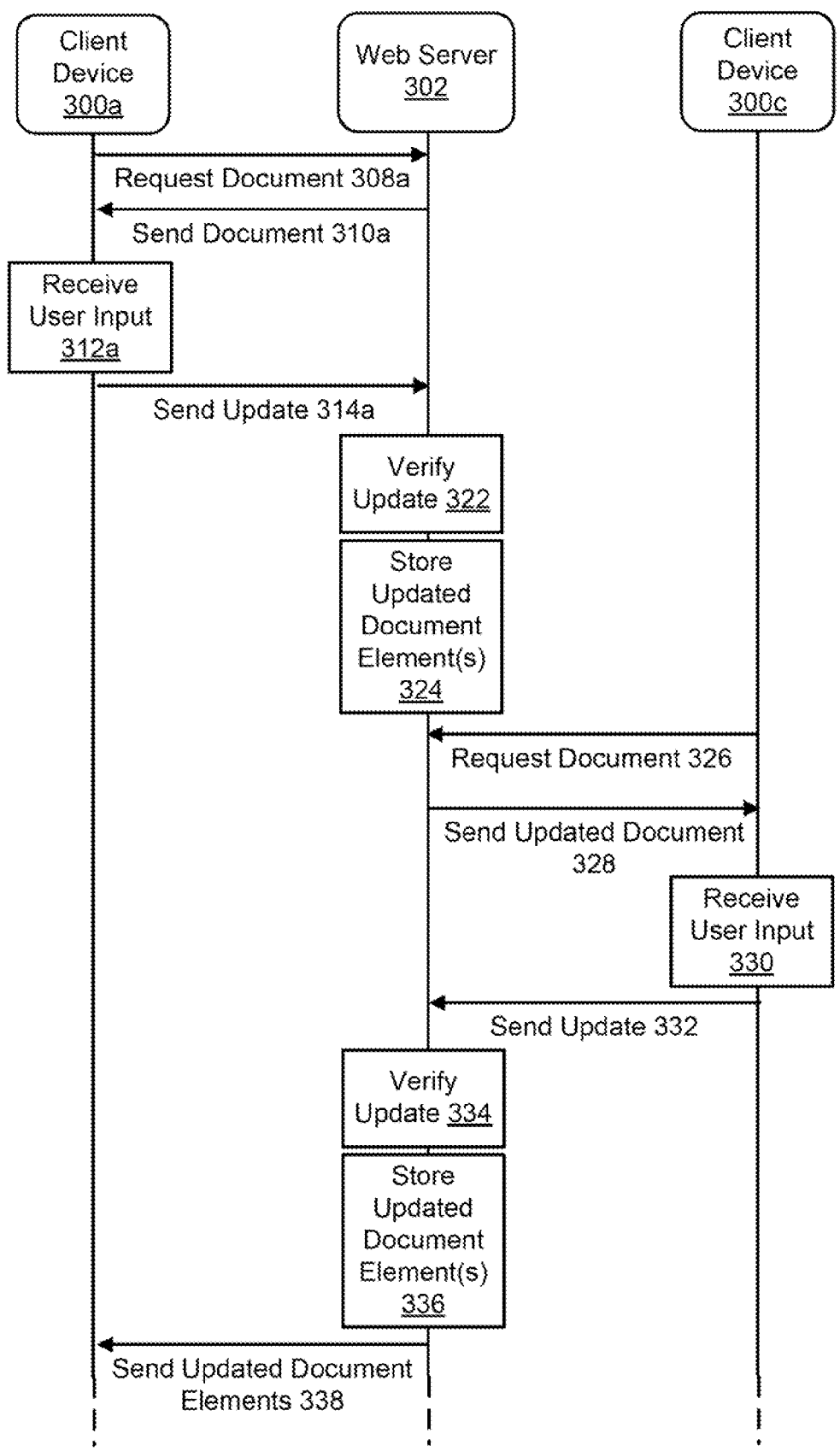
FIG. 3B is a signaling and flow diagram illustrating example interactions for making and distributing document updates in a document collaboration system.

FIG. 3B is a signaling and flow diagram illustrating example interactions for making and distributing updates to electronic documents in a document collaboration system such as the document collaboration system 100. At a high level, the illustrated example depicts two users collaboratively editing a shared document substantially in sequence. The client device 300a requests 308a the document (such as one of the collection of electronic documents 110) from the web server 302. In response, the web server 302 sends 310a the requested document to the client device 300a.

The client device 300a receives 312a user input, for example, providing instructions for editing or otherwise updating the document. The update to the document is sent 314a to the web server 302 which verifies 322 and stores 324 the updated document element(s).

A client device 300c requests 326 the document from the web server 302, and the web server 302 responds by sending 328 the updated document to the client device 300c. The client device 300c receives 330 user input to update the document, and sends 332 the update to the web server 302. The web server verifies 334 and stores 336 the updated document element(s), and sends 338 the updated document element(s) to the client device 300c. In some implementations, by proactively sending 338 the updated document element(s) to the client device 300a, the user of the client device 300a can be informed of other users' collaborative activities, and the copy of the document being edited on the client device 300a can be kept up to date with changes made by other users.

Figure 3C:
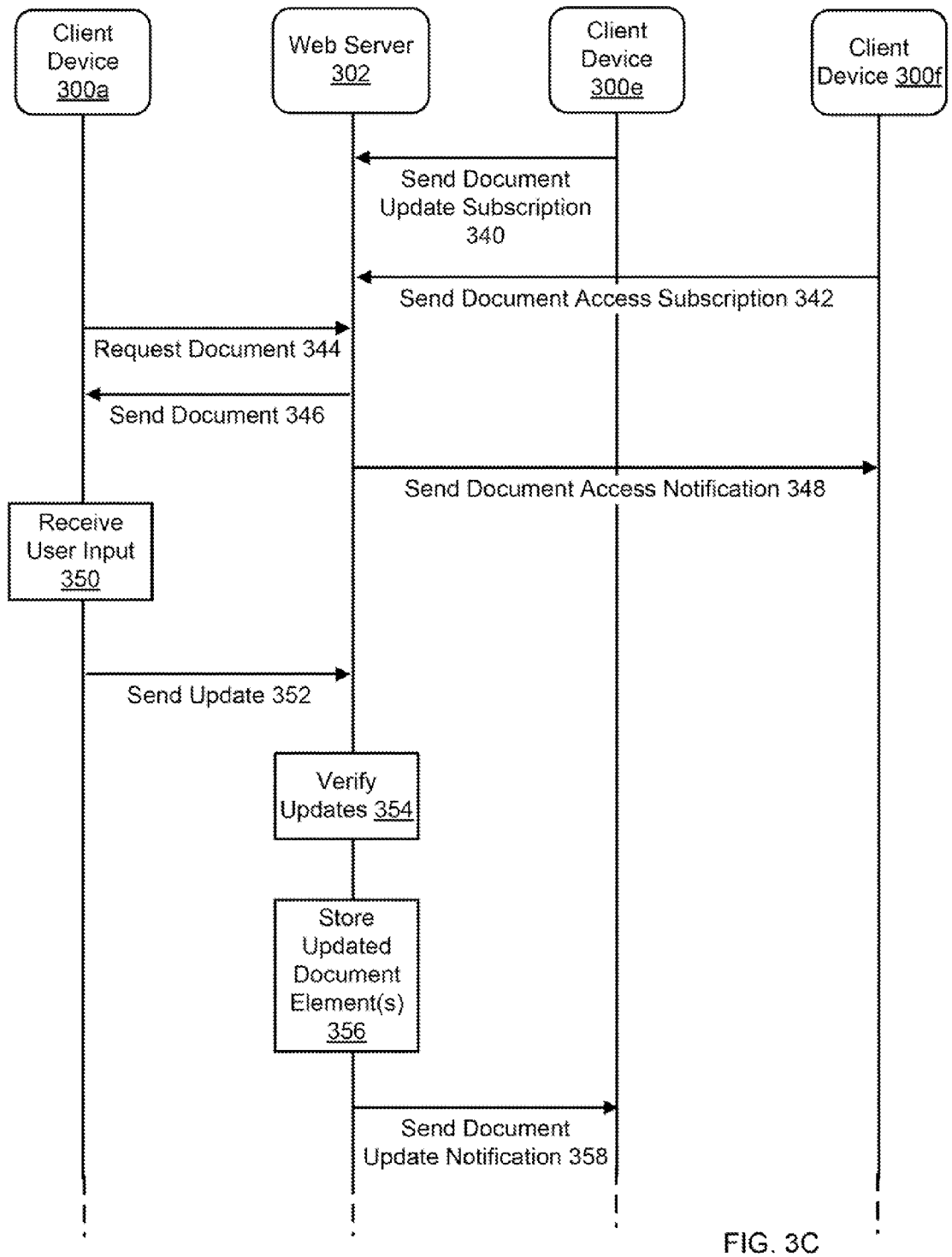
FIG. 3C is a signaling and flow diagram illustrating example interactions for distributing document updates in an example document collaboration system.

FIG. 3C is a signaling and flow diagram illustrating example interactions for subscribing to and distributing document updates in an example document collaboration system. At a high level, one or more users can request to be notified when changes are made to a document. In the illustrated example, a client device 300e sends 340 a document update subscription to the web server 302. In some implementations, the document update subscription can be a request to the web server 302 to have notifications sent to the subscriber when other users modify or otherwise update one or more electronic documents identified in the request.

A client device 300f sends 342 a document access subscription to the web server 302. In some implementations, the document access subscription can be a request that the web server 302 send notifications sent to the subscriber when other users access or modify one or more specified electronic documents and/or document elements.

The client device 300a requests 344 an electronic document from the web server 302, and in response the web server 302 sends 346 the requested document to the client device 300a. The web server 302 also acknowledges the client device's 300f document access subscription by sending 348 a document access notification. For example, by receiving the document access notification, the user of the client device 300f can be notified that the user of the client device 300a has accessed the document.

The client device 300a then receives 350 some user input, for example, by the user editing the electronic document. The client device 300a sends 352 an update to the web server 302 to notify the web server 302 of the changes made to the document. The web server 302 verifies 354 the updates and stores 356 the updated document element(s).

Based on the client device's 300e document update subscription and the document update, the web server sends 358 a document update notification to the client device 300e. In some implementations, by honoring document update subscriptions, users can remain notified about changes being made to a shared document.

In some implementations, document subscription notifications (e.g., access, update, creation, deletion, ownership change, membership change, permissions change, etc.) can be sent to rich internet applications running on client devices. For example, a document subscription notification may be sent to the client device 102a of FIG. 1A, and the notification can be presented to the user in the presence information pane 118a. In some implementations, document subscription notifications may be sent to users through other resources. For example, subscription notifications can be sent to users as email messages, instant messenger messages, text messages, voicemail, or other communication systems. In some implementations, document subscription notifications may be collected and presented to the user at a later time. For example, notifications may be presented as a Really Simple Syndication (RSS) feed that the user can receive updates to and view in the user's preferred RSS reader.

Figure 4A:
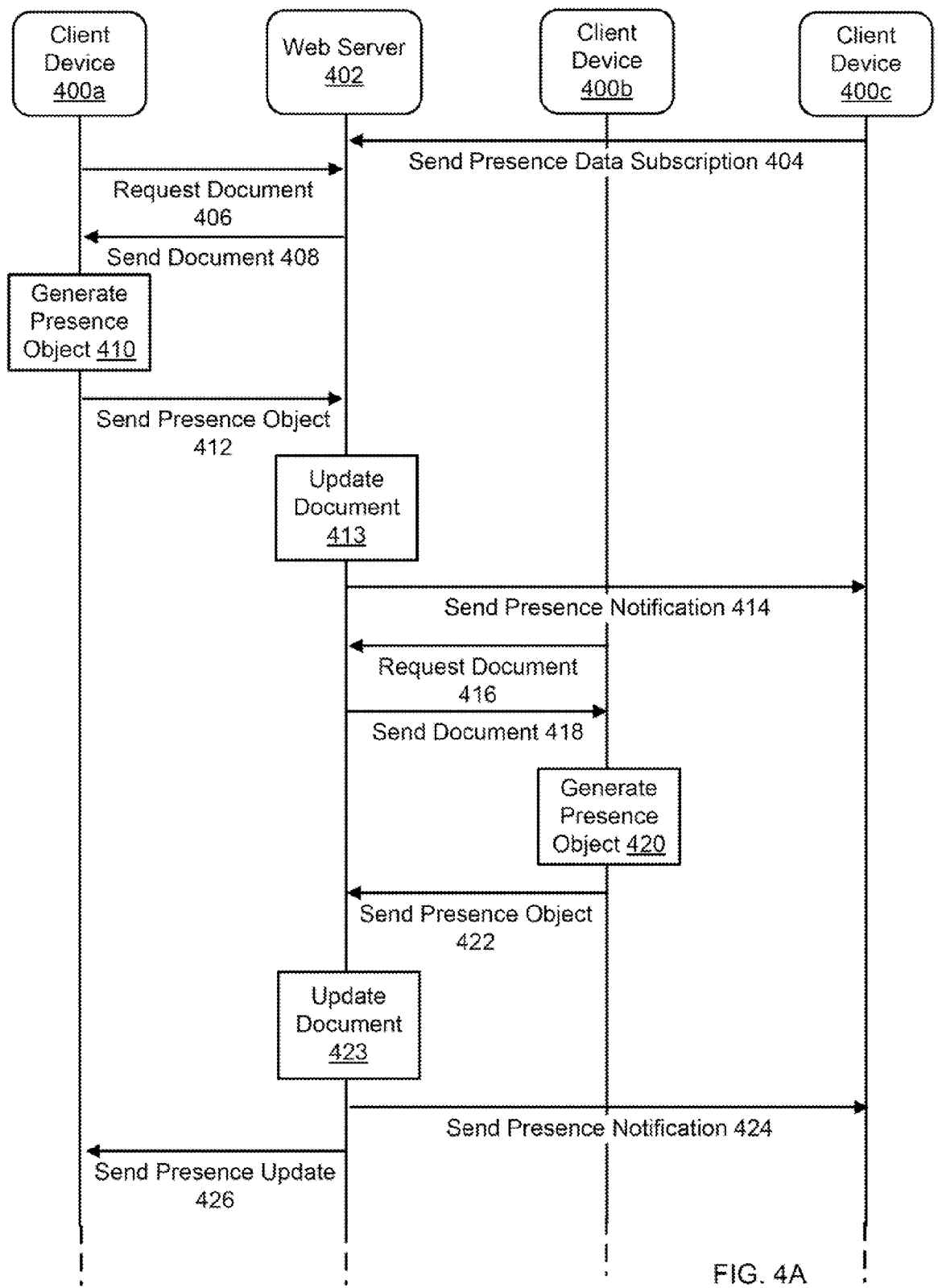

FIGS. 4A and 4B illustrate a signaling and flow diagram of an example process for subscribing to and distributing presence information in a document collaboration system. In the illustrated example, multiple users can be made aware of other users' actions with respect to an electronic document. In some embodiments, the illustrated system can be the electronic document collaboration system 100 of FIG. 1A. The illustrated system can be executed in addition to the content stream operations discussed in the descriptions of FIGS. 3A-3C. For example, because each electronic document includes a presence stream that can incorporate multiple presence objects, the same and/or similar systems and processes used for updating and distributing document content updates can also be used for updating and distributing of presence data. For example, the same encryption protocol can be used for encrypting both content data objects and presence data objects, the same authentication protocols can be used for encrypting both content data objects and presence data objects, and/or the same access control techniques can be used for both content objects and presence data objects.

In the illustrated example, a client device 400c sends 404 a presence data subscription request to a web server 402. In some implementations, by subscribing to presence data updates for a document, a user can be notified about the activities of other users who access the document.

A client device 400a requests 406 a document from the web server 402, and the web server 402 responds by sending 408 the requested document to the client device 400a. The client device 400a generates 410 a presence object and adds the presence object to the presence stream of the document. The client device 400a then sends 412 the updated presence stream and/or the newly created presence object to the web server 402. In some implementations, the presence object can include information that describes what the user is doing in relation to an electronic document. For example, the presence object can identify the user, the document the user is interacting with, the location in the document where the user is interacting, or the nature of the interaction (e.g., viewing, editing, etc.).

The web server 402 updates 413 the document to include the received presence object. The web server 402 also sends 414 a presence notification to the client device 400c as part of the client device's 400c presence data subscription, thereby alerting the client device 400c of the presence of the user in the document requested by the client 400a.

A client device 400b also requests 416 the document, and the web server 402 responds by sending 418 the document to the client device 400b. The document sent to the client device 400b includes the presence object associated with the client device 400a. The client 400b generates 420 a presence object and adds the presence object to the presence stream of the document. The client device 400c then sends 422 the updated presence stream and/or the newly created presence object to the web server 402. The web server 402 updates 423 the document to include the client device's 400b presence object.

The web server 402 sends 424 a presence notification to the client device 400c according to the client device's 400c subscription. The web server 402 also sends 426 a presence update to the client device 400a to alert the client device 400a that the user of the client device 400b has collaboratively joined the document. In some cases, the web server sends all or multiple parts of the presence stream to the client device 400a, which includes sending the presence object associated with client device 400b.

Referring now to FIG. 4B, the user of the client device 400a edits 428 the document, and the presence object for the client device 400a is updated to show an "editing" status. A presence update is sent 430 to the web server 402 to indicate the new status of the electronic document for the client device 400a. In some implementations, the updated presence object may also indicate what page, line number, cell, or slide is being edited. The web server 402 updates 431 the document based on the presence update, and sends 432 a presence update to the client device 400b and sends 434 a presence notification to the client device 400c.

After the user of the client device 400a has finished the edit, the client device 400a sends 436 a content update to the web server 402. The web server 402 updates 437 the document based on the content update received from the client 400a. A content update 438 is then sent to the client device 400b to update the client device's 400b copy of the document to reflect the updates made at the client 400a. The content update sent from the client device 400a and/or the content update sent to the client device 400c may also include presence data.

The user of client device 400a closes 442 the document, and the presence object for the client device 400a is updated to show a status of "offline" to reflect that the user is no longer collaboratively interacting with the document. Alternatively, the presence object associated with client device 400a may be deleted from the presence stream of the document. The client 400a sends 444 nd presence update to the web server 402, and the web server 402 updates 445 the document's presence stream based on the presence data received from the client 400a. The web server 402 then sends 446 a presence update to the client device 400b and sends 448 a presence update notification to the client device 400c.

In some implementations, the web server 402 may update presence information for a user or client device automatically. For example, if the web server 402 does not receive presence updates within a given time limit, the web server 402 may assume that the user is no longer actively working with the document (e.g., minimized the document, activity is idle, etc.)

or that the connection to the client device has been lost. The web server 402 may detect failure to receive a "heartbeat" message from a client and respond by automatically updating the user's presence to show a status of "offline", "away", "connection interrupted", or other status that can be used to describe the automatically detected status of the user.

Figure 5A:
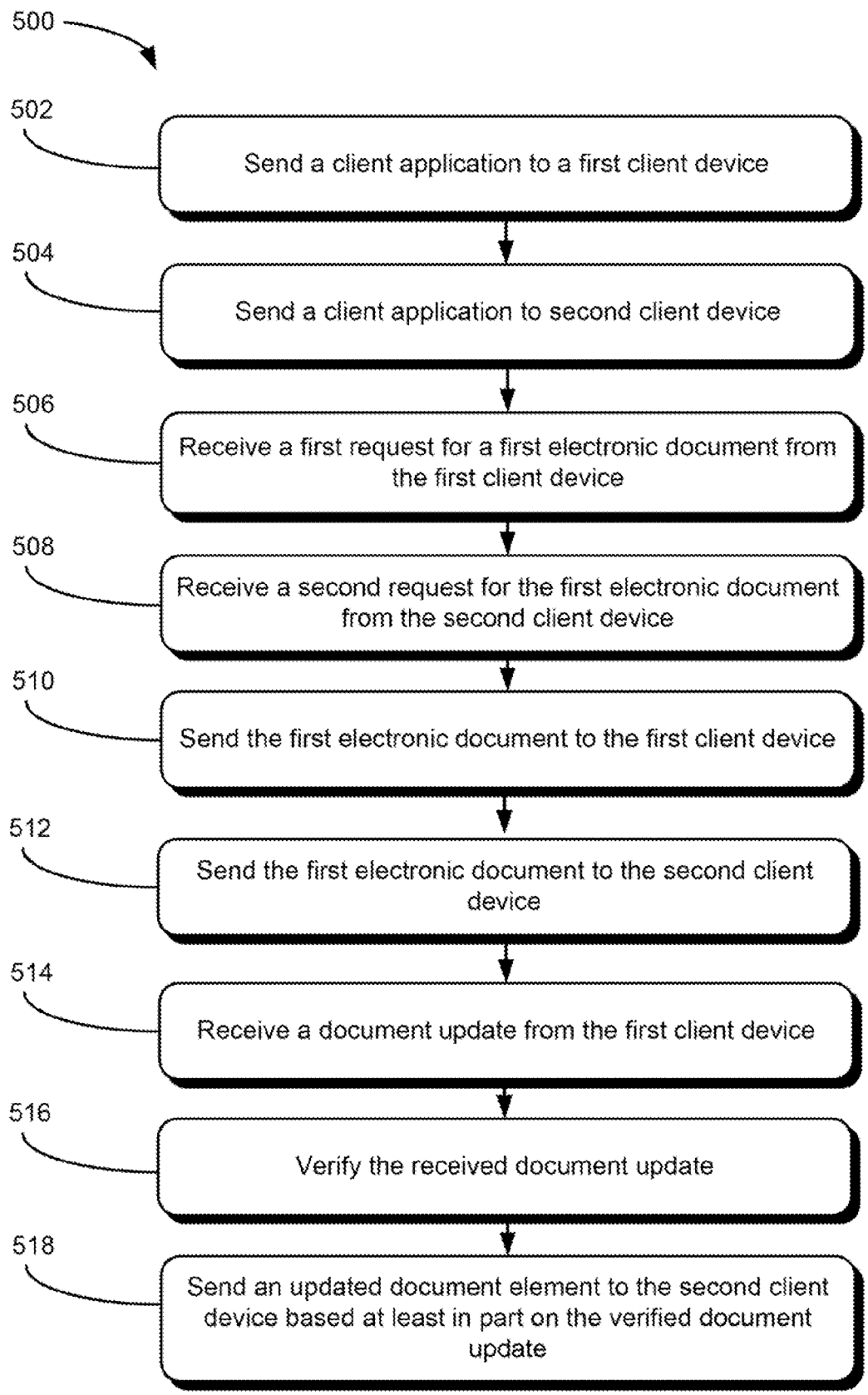
FIG. 5A is a flow diagram of an example process for distributing document objects in a document collaboration system.

FIG. 5A is a flow diagram of an example process 500 for distributing document objects in a document collaboration system such as the document collaboration system 100 of FIG. 1A. At 502, a rich internet application is sent to a first client device. For example, the web server 104 can send the rich application interface 112a to the client device 102a over the network 108. In some implementations, the rich client application can be a word processing application, a spreadsheet program, a presentation slide show editor, or other application that can be executed on the client device for editing other types of electronic documents. At 504, the rich internet application is sent to a second client device.

At 506, the web server receives from the first client device a request for a first electronic document, and at 508, the web server receives a request for the first electronic document from the second client device. At 510, the web server responds by sending the first electronic document to the first client device, and at 512, the web server responds by sending the first electronic document to the second client device. In some implementations, the electronic document can include one or more document elements that are formatted according to a document schema, where the document elements include one or more content elements and one or more presence elements. In some implementations, the web server can encrypt the document using an encryption protocol before sending the document over the network.

At 514, the web server receives a document update from the first client device. For example, the user of the first client device may have made some edits to the first document, and the client device can respond by sending those updates to the web server. In some implementations, the document updates can includes information that identifies the particular document page, spreadsheet cell, presentation slide, line number, paragraph, particular graphic item, particular text item that the user has edited, or other information that can identify the location of user edits within an electronic document. For example, a document update for a video editor may include a scene number or time index to indicate where has edited a video file. In some implementations, the client device can encrypt document updates before they are sent to the web server.

At 516, the web server verifies the received document update. In some implementations, the web server can verify the document update by authenticating the identity of the user who performed the updates, by determining if the update adheres to the document schema, by determining whether the update was secured according to proper protocols, or by performing other checks that can verify the authenticity, format, security, or integrity of the document update.

At 518 the web server sends an updated document element to the second client device, wherein the update is based at least in part on the verified document update. For example, the web server may receive an update from one client device, and distribute those additions, modifications, or deletions to other users who are collaborating on the same document, to keep the content of the multiple instances of the document in synchronization. In some implementations, the web server can use an encryption protocol to encrypt the document updates before sending them to the second client device.

Figure 5B:
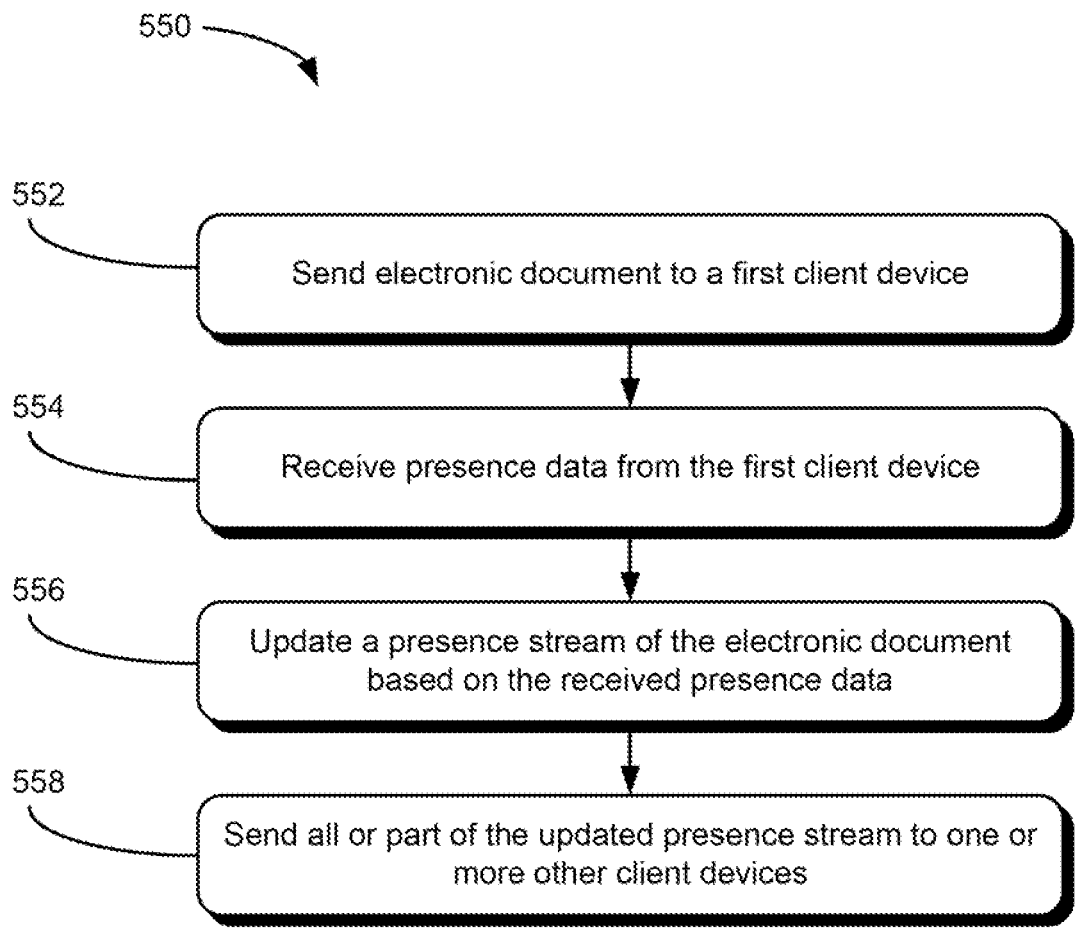
FIG. 5B is a flow diagram of an example process for distributing presence information in a document collaboration system.

FIG. 5B is a flow diagram of an example process 550 for distributing presence information in a document collaboration system, such as the document collaboration system 100 of FIG. 1A. At 552, the web server sends an electronic document to a first client device, for example, in response to a document request. The electronic document can include access control data that identifies of one or more users permitted to access the first electronic document. For example, the access control data can identify particular users and/or user groups who have permission to access the electronic document. The access control data can include various levels of permissions, such as permission to read, write, execute, modify, and/or take other types of actions with respect to the electronic document. The access control data for the electronic document can be used to control user access to both the content stream and the presence stream of the document. For example, before sending the electronic document to a client device, the web server can determine whether a user associated with the client device is permitted to access the electronic document based on the access control data stored in the electronic document. Similarly, before sending presence information relating to the electronic document to a client device, the web server can determine whether a user associated with the client device is permitted to access the electronic document based on the access control data stored in the electronic document.

Once the client device has received the electronic document, the client device generates presence object data that includes information describing the user's activities with regard to the document (e.g., whether the user is viewing the document, whether the user is editing the document, the location of the cursor, and/or other information) and sends the presence object to the web server. In some implementations, the client can use an encryption protocol to encrypt the presence object prior to sending the object over the network.

In some implementations, the presence data can include information that identifies the particular document page, spreadsheet cell, presentation slide, line number, paragraph, particular graphic item, particular text item that has been edited or other information that can describe the location where a user is interacting with an electronic document. In some implementations, the location of a cursor can be used to determine the location were a user is viewing or editing the electronic document.

At 554, the web server receives the presence data from the first client device, and at 556 the web server updates a presence stream of the electronic document based on the received presence data. For example, the web server can store the presence data in local memory, local persistent storage, or in a database. In some implementations, the web server can verify the presence data before updating the presence stream. For example, the web server can decrypt an encrypted presence data message to obtain the presence data secured within, the web server can authenticate the presence data to ensure that the presence data was received from a trusted source, and/or the web server can verify that the presence data complies with a presence object schema.

At 558, the web server sends part or all of the updated presence stream to one or more other client devices. For example, the web server may only send presence stream notifications to other users who are interacting with the same page, slide, or cell as the first user. As another example, the web server may send presence data to all users associated with the document, all users who have subscribed to presence notifications for the document, and/or all users currently accessing the document. In some implementations, the client devices receiving the updated presence data can use that data to update a presence information component or otherwise notify users of the collaborative activities of other users.

In some implementations, multiple versions of an electronic document or elements within an electronic document can be stored. For example, changes to any element of a document object can generate a new version of the object. In some implementations, requests for an electronic document may return the current version of an object or its members by default, but previous versions can also be retrieved by request. In some implementations, previous versions may be periodically culled by the web server or database. For example, since applications may have different needs the culling may be configurable through an application plug-in, declaration within the object model, or by otherwise defining how and when older versions of objects may be removed from storage.

In some implementations, each primary object can have a version counter which can be set to 1 (or zero, or some other initial value) by the web server or database when the object is created, and incremented on each transaction that modifies elements within the object. For example, each version counter can correspond to a snapshot of the object as of that transaction; the client may request a prior version of the object, and the results can be processed based on the snapshot corresponding to that version. In some implementations, although each object version can be a logically complete snapshot of the object, the web server may not make full copies of the entire object on every change. Instead, the web server can create per-element version copies of objects that can be affected by the transaction, and each element can be tagged with the version counter value as of that transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the described subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a first request for an electronic document, the first request received by a server over a data network from a first client device, the electronic document including a document element;
    sending the electronic document from the server over the data network to the first client device in response to the first request, and granting the first client device authorization to modify the document element;
    receiving a second request for the electronic document, the second request received by the server over the data network from a second client device;
    sending the electronic document from the server over the data network to the second client device in response to the second request, and granting the second client device authorization to modify the document element, such that the first and second client devices have authorization to modify the document element concurrently;
    receiving a first document update over the data network at the server from the first client device, the first document update including a first modification with respect to the document element;
    receiving, by the server from the first client device, presence data that includes identification of a status of the electronic document for the first client device;
    receiving a second document update over the data network at the server from the second client device, the second document update including a second modification with respect to the document element;
    verifying at the server the first document update if the first client device is authorized to initiate the first modification, and if the first modification does not conflict with the second modification based on comparing the first document update with the second document update;
    automatically sending an updated document element for the electronic document to the second client device over the data network, the updated document element generated based at least in part on a verified document update; and
    in response to receipt of the presence data from the first client device, automatically sending a presence object from the server to the second client device, wherein the presence object is based on the presence data and enables a user of the second client device to distinguish between whether the first client device is associated with an editing activity or a viewing activity with respect to the electronic document.

2. The method of claim 1, wherein the server comprises a plurality of server devices operating as a server cluster, and the data network comprises a publicly-accessible data network.

3. The method of claim 1, wherein the second document update is received over the data network at the server from the second client device prior to receiving the first document update.

4. The method of claim 1, further comprising:
receiving a document subscription from a third client device prior to receiving the first document update, the document subscription comprising a request for notification of document updates for the electronic document; and
sending an update notification to the third client device based on the verified document update.

5. The method of claim 1, wherein the electronic document identifies a hierarchical structure that includes the document element, and wherein the document element includes a child element according to the hierarchical structure.

6. The method of claim 1, wherein the document element is formatted according to a document schema for a rich internet application, the method further comprising:
sending computer-readable instructions over the data network from the server to the first client device, the computer-readable instructions, when executed by a processor, adapted to cause the processor to run the rich internet application, the server adapted to allow the first and second client devices to collaboratively access the electronic document; and
sending the computer-readable instructions over the data network from the server to the second client device.

7. The method of claim 6, wherein the rich internet application is selected from a group consisting of a word processing application, a spreadsheet application, and a presentation application.

8. The method of claim 1, further comprising:
retrieving the electronic document from a database to the server prior to sending the electronic document to the first client device, wherein the document element includes a version identifier; and
storing the updated document element for the electronic document in the database, wherein the updated document element includes a new version identifier.

9. The method of claim 1, wherein the first document update is received and the updated document element is sent while the server is providing collaborative access to the electronic document for the first client device and the second client device.

10. The method of claim 1, wherein the first document update is generated based on a user interaction with the first client device.

11. The method of claim 1,
wherein the second document update is received from the second client device after receiving the first document update; and
the method further comprises verifying the second document update.

12. The method of claim 11, wherein:
verifying the second document update comprises determining whether the second modification conflicts with the first modification.

13. The method of claim 1, wherein the presence object includes (a) identification of an activity associated with the first client device and (b) identification of a location within the electronic document corresponding to the activity.

14. The method of claim 1, wherein the first and second modifications are selected from a group consisting of a paragraph modification, a spreadsheet cell modification, and a slide modification.

15. The method of claim 1, wherein the updated document element is sent to the second client device while the first and second client devices still have authorization to modify the electronic document concurrently.

16. An article comprising a non-transitory computer-readable medium tangibly encoded with instructions that are operable when executed to cause one or more data processing apparatus to perform operations comprising:
receiving a first request for an electronic document, the first request received by a server over a data network from a first client device, the electronic document including a document element;
sending the electronic document from the server over the data network to the first client device in response to the first request, and granting the first client device authorization to modify the document element;
receiving a second request for the electronic document, the second request received by the server over the data network from a second client device;
sending the electronic document from the server over the data network to the second client device in response to the second request, and granting the second client device authorization to modify the document element, such that the first and second client devices have authorization to modify the document element concurrently;
receiving a first document update over the data network at the server from the first client device, the first document update including a first modification with respect to the document element;
receiving, by the server from the first client device, presence data that includes identification of a status of the electronic document for the first client device;
receiving a second document update over the data network at the server from the second client device, the second document update including a second modification with respect to the document element;
verifying at the server the first document update if the first client device is authorized to initiate the first modification, and if the first modification does not conflict with the second modification based on comparing the first document update with the second document update;
automatically sending an updated document element for the electronic document to the second client device over the data network, the updated document element generated based at least in part on a verified document update; and
in response to receipt of the presence data from the first client device, automatically sending a presence object from the server to the second client device, wherein the presence object is based on the presence data and enables a user of the second client device to distinguish between whether the first client device is associated with an editing activity or a viewing activity with respect to the electronic document.

17. The article of claim 16, the operations further comprising:
receiving a document subscription from a third client device prior to receiving the first document update, the document subscription comprising a request for notification of document updates for the electronic document; and
sending an update notification to the third client device based on the verified document update.

18. The article of claim 16,
wherein the second document update is received from the second client device after receiving the first document update; and
the operations further comprising verifying the second document update.

19. The article of claim 16, wherein the presence object includes (a) identification of an activity associated with the first client device and (b) identification of a location within the electronic document corresponding to the activity.

20. The article of claim 16, wherein the document element is formatted according to a document schema for a rich internet application, the operations further comprising:
sending computer-readable instructions over the data network from the server to the first client device, the computer-readable instructions, when executed by a processor, adapted to cause the processor to run the rich internet application, the server adapted to allow the first and second client devices to collaboratively access the electronic document; and
sending the computer-readable instructions over the data network from the server to the second client device.

21. A system comprising:
one or more servers operable to perform operations including:
receiving a first request for an electronic document, the first request received by a server over a data network from a first client device, the electronic document including a document element;
sending the electronic document from the server over the data network to the first client device in response to the first request, and granting the first client device authorization to modify the document element;
receiving a second request for the electronic document, the second request received by the server over the data network from a second client device;
sending the electronic document from the server over the data network to the second client device in response to the second request, and granting the second client device authorization to modify the document element, such that the first and second client devices have authorization to modify the document element concurrently;
receiving a first document update over the data network at the server from the first client device, the first document update including a first modification with respect to the document element;
receiving, by the server from the first client device, presence data that includes identification of a status of the electronic document for the first client device;
receiving a second document update over the data network at the server from the second client device, the second document update including a second modification with respect to the document element;
verifying at the server the first document update if the first client device is authorized to initiate the first modification, and if the first modification does not conflict with the second modification based on comparing the first document update with the second document update;
automatically sending an updated document element for the electronic document to the second client device over the data network, the updated document element generated based at least in part on a verified document update; and
in response to receipt of the presence data from the first client device, automatically sending a presence object from the server to the second client device, wherein the presence object is based on the presence data and enables a user of the second client device to distinguish between whether the first client device is associated with an editing activity or a viewing activity with respect to the electronic document.

22. The system of claim 21, wherein the server comprises a plurality of server devices operating as a server cluster, and the data network comprises a publicly-accessible data network.

23. The system of claim 21, wherein the document element is formatted according to a document schema for a first rich internet application, and wherein the rich internet application is configured to communicate with the server independent of a web browser application.

24. The system of claim 21, wherein the document element is formatted according to a document schema for a first rich internet application, wherein the server is a web server, and wherein the rich internet application is configured to utilize a web browser application installed on at least one of the first and second client devices to facilitate communication with the web server.

25. The system of claim 21, wherein the document element is formatted according to a document schema for a first rich internet application, wherein the server is a web server, and wherein the rich internet application is adapted to generate a graphical user interface for presentation within a web browser application installed on at least one of the first and second client devices.

26. The system of claim 21, wherein the first client device includes a handheld mobile device.

27. The system of claim 21, wherein the document element is formatted according to a document schema for a rich internet application, the operations further including:
sending computer-readable instructions over the data network from the server to the first client device, the computer-readable instructions, when executed by a processor, adapted to cause the processor to run the rich internet application, the server adapted to allow the first and second client devices to collaboratively access the electronic document; and
sending the computer-readable instructions over the data network from the server to the second client device.

* * * * *